US011422727B2

(12) United States Patent
Mandagere et al.

(10) Patent No.: US 11,422,727 B2
(45) Date of Patent: Aug. 23, 2022

(54) RESTORING A STORAGE SYSTEM USING FILE RELOCATION METADATA

(71) Applicant: Cohesity, Inc., San Jose, CA (US)

(72) Inventors: Nagapramod Mandagere, Mountain View, CA (US); Yu-Shen Ng, Mountain View, CA (US); Karandeep Singh Chawla, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 18 days.

(21) Appl. No.: 15/931,197

(22) Filed: May 13, 2020

(65) Prior Publication Data

US 2021/0357140 A1 Nov. 18, 2021

(51) Int. Cl.
*G06F 12/00* (2006.01)
*G06F 3/06* (2006.01)

(52) U.S. Cl.
CPC .......... *G06F 3/0647* (2013.01); *G06F 3/0619* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,751,997 A | 5/1998 | Kullick | |
| 7,257,690 B1 | 8/2007 | Baird | |
| 10,255,137 B1 | 4/2019 | Panidis | |
| 2007/0299880 A1 | 12/2007 | Kawabe | |
| 2013/0110778 A1 | 5/2013 | Taylor | |
| 2013/0111171 A1 | 5/2013 | Hirezaki | |
| 2014/0244937 A1 | 8/2014 | Bloomstein | |
| 2016/0034356 A1 | 2/2016 | Aron | |
| 2017/0242871 A1* | 8/2017 | Kilaru | G06F 11/2094 |
| 2019/0250998 A1 | 8/2019 | Bedadala | |
| 2019/0384678 A1 | 12/2019 | Samprathi | |
| 2021/0081285 A1* | 3/2021 | Charfauros | G06F 11/1458 |

FOREIGN PATENT DOCUMENTS

| | | |
|---|---|---|
| EP | 3451173 | 6/2020 |
| WO | 2019045987 | 3/2019 |

OTHER PUBLICATIONS

Draper et al, "The Architecture of the DIVA Processing-In-Memory Chip", Jun. 22-26, 2002, p. 14 (Year: 2002).

* cited by examiner

*Primary Examiner* — Jason W Blust
(74) *Attorney, Agent, or Firm* — Van Pelt, Yi & James LLP

(57) ABSTRACT

A request to restore a plurality of files to a first storage system from a backup stored at a second storage system is received. Corresponding file relocation metadata for each of the plurality of files is provided to the first storage system. The corresponding file relocation metadata for each of the plurality of files enables accessibility of contents of the plurality of files at the first storage system without storing entire contents of the plurality of files at the first storage system. A corresponding full content version for at least one of the plurality of files that is to be utilized by the first storage system is provided to enable direct access at the first storage system to contents of the at least one of the plurality of files instead of utilizing corresponding file relocation metadata for the at least one of the plurality of files to access the contents of the at least one of the plurality of files.

17 Claims, 15 Drawing Sheets

RESTORING A STORAGE SYSTEM USING FILE RELOCATION METADATA

BACKGROUND OF THE INVENTION

A primary storage system may store a plurality of files (e.g., content files, text files, binary files, etc.). The primary storage system may back up the plurality of files to a secondary storage system at a first moment in time. At some point in time, the plurality of files stored on the primary storage system may become unavailable. For example, a hard drive of the primary storage system storing the plurality of files may have crashed. The secondary storage system may restore the primary storage system to a state associated with the first moment in time by sending the data associated with the plurality of files. However, this may take a long time to perform depending on an amount of data associated with the plurality of files.

BRIEF DESCRIPTION OF THE DRAWINGS

Various embodiments of the invention are disclosed in the following detailed description and the accompanying drawings.

DETAILED DESCRIPTION

Figure 1:
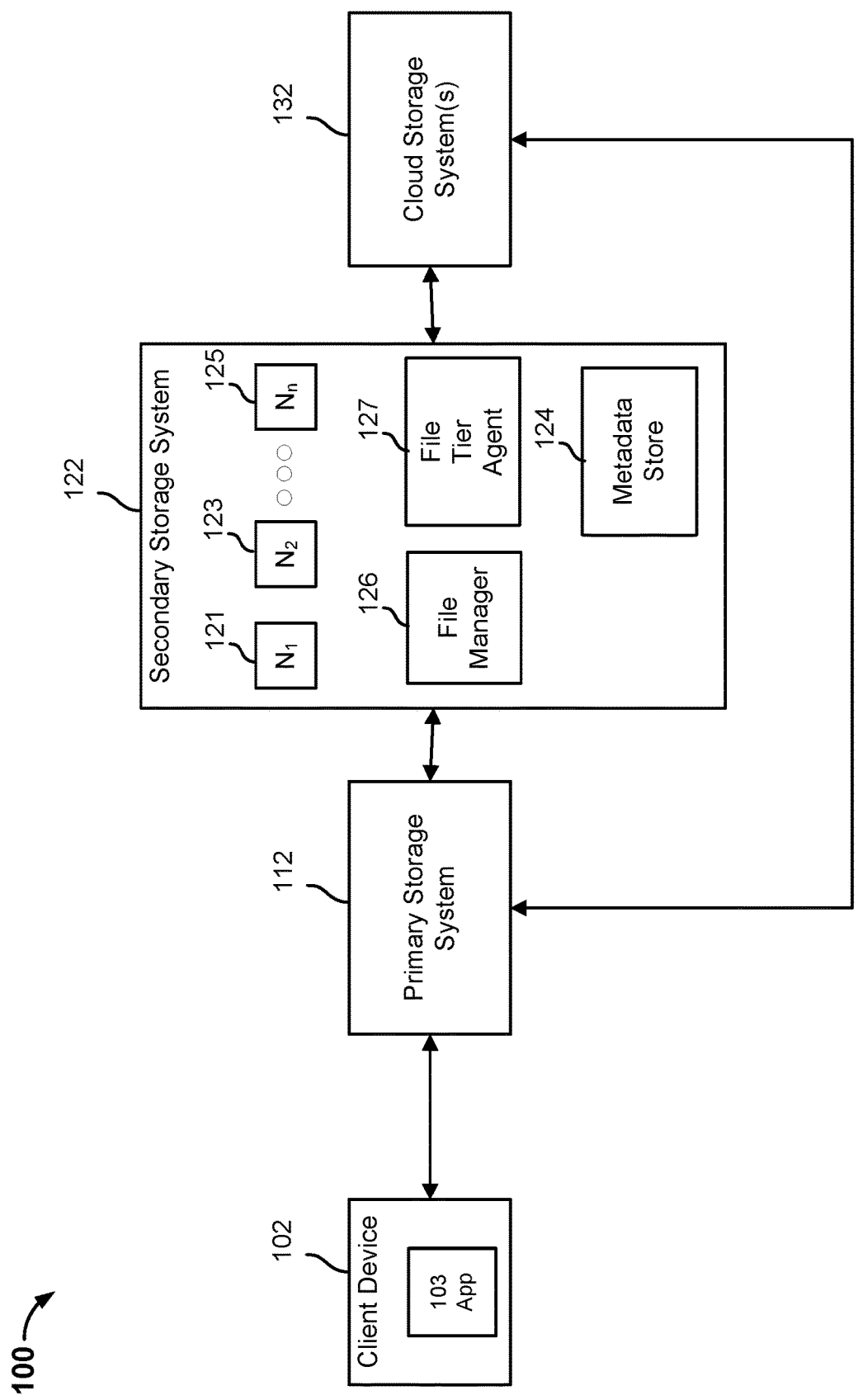
FIG. 1 is a block diagram illustrating an embodiment of a system for restoring files.

A primary storage system stores a plurality of files (e.g., content files, text files, binary files, etc.). The primary storage system is configured to maintain metadata associated with each of the files. For example, the metadata may include access control information and historical information. Access control information may include the owner of the file, the creator of the file, the last modifier of the file, users or groups allowed to read, write, modify access to the file, and more. Historical information may include a creation time, a last edited time, a last read time, a last access time, etc. The metadata associated with each of the files that is maintained by the primary storage system may be referred to as source metadata. A secondary storage system may receive a backup snapshot of the primary storage's file system data. The file system data includes data associated with the plurality of files and the metadata associated with each of the files. The backup snapshot may be a full backup snapshot that includes all of the file system data associated with the primary storage system or an incremental backup snapshot that includes all of the file system data associated with the primary storage system that was not included in a previous backup snapshot.

A secondary storage system is comprised of a plurality of storage nodes. The secondary storage system may ingest and store the file system data across the plurality of storage nodes. The secondary storage system may organize a view of the file system data using a tree data structure. A view of the file system data may be comprised of a file system metadata snapshot tree, which may be based on a B+ tree structure (or other type of tree structure in other embodiments) and one or more file metadata structures. A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. Each intermediate node includes one or more pointers to other nodes (e.g., a lower intermediate node or a leaf node). A leaf node may store file metadata, file system metadata, data associated with a file that is less than or equal to a limit size (e.g., 256 kB), an identifier of a data brick, one or more pointers to one or more file metadata structures (e.g., binary large object structure), a pointer to a data chunk stored on the storage system, a pointer to another leaf node, etc. The file metadata stored by the file system metadata snapshot tree includes the file metadata that was included in a backup snapshot, which may include, but is not limited to, access control information (such as the owner of the file, the creator of the file, the last modifier of the file, users or groups allowed read, write, modify access to the file, and more) and historical information (such as a creation time associated with a file, a last edited time associated with a file, a last read time associated with a file, and/or a last access time associated with a file).

The primary storage system may initially perform a full backup snapshot of its file system data and the secondary storage system is configured to generate a tree data structure that includes an initial file system metadata snapshot tree. The primary storage system may subsequently perform one or more incremental backup snapshots of its file system data and update the tree data structure to include one or more corresponding file system metadata snapshot trees. The tree data structure enables a plurality of backup snapshots to be linked such that each file system metadata snapshot tree provides a complete view of the primary storage system corresponding to a moment in time when the backup snapshot was performed. A file system metadata snapshot tree corresponding to an incremental backup snapshot provides a complete view of the primary storage system at the particular moment in time because the file system metadata snapshot tree corresponding to the incremental backup snapshot includes references to data of the primary storage system that was previously stored. For example, a node associated with a file system metadata snapshot tree corresponding to the incremental backup snapshot may include one or more references to nodes associated with one or more previous file system metadata snapshot trees that correspond to one or more previous backup snapshots. The tree data structure allows the primary storage system to be restored to any moment in time for which there is an associated backup snapshot because each file system metadata snapshot tree provides a complete view of the primary storage system corresponding to a moment in time when the backup snapshot was performed.

Each time a backup snapshot is performed by the primary storage system, the secondary storage system generates a corresponding file system metadata snapshot tree. After one or more backup snapshots are performed, the secondary storage system may be configured to infer metadata associated with a file. The inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The source metadata associated with a file included in a plurality of backup snapshots associated with a particular period of time may be analyzed to determine when events occurred on the file. For example, the first time a file is generated on the primary storage system and backed up to the secondary storage system, the file system metadata snapshot tree corresponding to the backup snapshot may store a creation time associated with the file (i.e., a creation time of the file on the primary storage system). The file may be subsequently edited by a user associated with the primary storage system. The data associated with the edited version of the file may be included in a subsequent backup snapshot. The file system metadata snapshot tree corresponding to the subsequent backup snapshot may store a modification time associated with the edited version of the file. The secondary storage system may infer metadata associated with the file based on the source metadata. For example, the secondary storage system may determine an estimated number of times that the file has been accessed within a particular period of time based on the one or more file system metadata snapshot trees that were generated during the particular period of time.

The source metadata associated with the file provides the secondary storage system with point-in-time metadata information. The source metadata associated with the file may have changed a plurality of times in between backup snapshots, but the source metadata associated with the file included in a backup snapshot represents a state of the source metadata associated with the file at the time the backup snapshot is performed. For example, the data associated with a file may have been modified a plurality of times in between backup snapshots. The source metadata associated with the file may include a modification timestamp for the most recent modification and may not include modification timestamps for the modifications that occurred between the previous backup snapshot and the most recent modification. In some embodiments, the estimated number of times that the file has been modified within a particular period of time is the actual number of times that the file has been modified within a particular period of time (e.g., the file has been modified no more than one time in between backup snapshots for any of the backup snapshots within the particular period of time). In some embodiments, the estimated number of times that the file has been modified within a particular period of time is an approximate number of times that the file has been modified within a particular period of time (e.g., the file has been modified more than one time in between backup snapshots for at least one of the backup snapshots within the particular period of time). Other source metadata information associated with a file, such as read times, access times, whether and when access controls were changed, by whom, and who has access, etc., may be included in a backup snapshot, and analysis on the secondary storage system of such metadata may similarly yield additional inferred metadata about the file.

The data associated with the file that is received in one or more backup snapshots may be analyzed over a particular period of time to determine when events occurred on the file. For example, the first time data associated with a file is included in a backup snapshot to the secondary storage system, a corresponding file metadata structure is generated for the file. The backup snapshot has an associated timestamp that indicates when the backup snapshot was performed. For example, a primary storage system may perform one or more backup snapshots that include data associated with the file and the secondary storage system generates a corresponding metadata structure each time a backup snapshot includes data associated with the file. Each of the one or more backup snapshots have associated timestamps that indicate when the one or more backup snapshots were performed.

The secondary storage system may infer metadata associated with the file based on the data associated with the file that is received in one or more backup snapshot's source metadata. For example, the secondary storage system may compare metadata structures associated with a file to determine an estimated number of times the file was modified within a particular time period. The data associated with the file may have been modified a plurality of times in between backup snapshots, but the data associated with the file that is included in a backup snapshot is a cumulative data change of the data associated with the file in between backup snapshots. In some embodiments, the estimated number of times that the file was modified within a particular time period is the actual number of times that the file has been accessed within a particular period of time (e.g., the file has been modified no more than one time in between backup snapshots for any of the backup snapshots within the particular period of time). In some embodiments, the estimated number of times that the file was modified within a particular time period is an approximate number of times that the file has been modified within a particular period of time (e.g., the file has been modified more than one time in between backup snapshots for at least one of the backup snapshots within the particular period of time).

The secondary storage system may compare metadata structures associated with a file to determine an estimated amount of data of the file that has changed within a particular time period. Data may have been removed and/or added to a file in between backup snapshots, but the estimated amount of data of the file that has changed is based on a latest version of the file. For example, a file may have a size of 10 GB. In between backup snapshots, 1 GB of data may have been removed from a file and 2 GB of data may have been added to the file. The latest version of the file has a size of 11 GB. Thus, the estimated amount of data of the file that has changed is 1 GB. In some embodiments, the estimated amount of data of the file that has changed within a particular time period is the actual amount of data of the file that has changed within a particular time period (e.g., the file has been modified no more than one time in between backup snapshots within the particular period of time). In some embodiments, the estimated amount of data of the file that has changed within a particular time period is an approximate amount of data of the file that has changed within a particular time period (e.g., the file has been modified more than one time in between backup snapshots for at least one of the backup snapshots within the particular period of time).

Metadata associated with a file may be inferred based on backup snapshot information. For example, the first time data associated with a file is included in a backup snapshot to the secondary storage system, a corresponding metadata structure is generated for the file. The backup snapshot has an associated timestamp that indicates when the backup snapshot was performed. In the absence of creation time metadata for a file, a creation time of the file on the primary storage system may be estimated to be the timestamp associated with the backup snapshot even though the file is created on the primary storage system before the backup snapshot is performed. One or more backup snapshots of the primary storage system that include data associated with the file may be performed and the secondary storage system generates a corresponding metadata structure each time a backup snapshot includes data associated with the file. Each of the one or more backup snapshots have associated timestamps that indicate when the one or more backup snapshots were performed. The secondary storage system may infer metadata associated with the file based on the backup snapshot information. For example, the secondary storage system may compare timestamps associated with file metadata structures associated with a file to determine an estimated number of times the file was modified within a particular time period. In some embodiments, the estimated number of times that the file was modified within a particular time period is the actual number of times that the file has been modified within the particular period of time (e.g., the file has been modified no more than one time in between backup snapshots within the particular period of time). In some embodiments, the estimated number of times that the file was modified within a particular time period is an approximate number of times that the file has been modified within the particular period of time (e.g., the file has been modified more than one time in between backup snapshots for at least one of the backup snapshots within the particular period of time).

At some point in time, the primary storage system becomes corrupted and the plurality of files stored on the primary storage system are not accessible. The secondary storage system may be used to restore the primary storage system to a point in time for which a backup snapshot was performed. Other systems may restore all of the data associated with the plurality of files stored by the primary storage system. However, restoring all of the data associated with the plurality of files stored by the primary storage system may take a long time to perform (e.g., hours, days, etc.). The plurality of restored files may not be accessible until all of the data associated with the plurality of files has been restored to the primary storage system.

A user associated with the primary storage system may send to the secondary storage system a request to restore the primary storage system to a particular moment in time. In response to receiving the request, the secondary storage system may clone a file system metadata snapshot tree corresponding to the particular moment in time and use the cloned file system metadata snapshot tree corresponding to the particular moment in time to identify a plurality of files that were stored on the primary storage system at the particular moment in time. In some embodiments, the file system metadata snapshot tree corresponding to the particular moment in time is used to identify the plurality of files that were stored on the primary storage system at the particular moment in time. The plurality of files associated with the cloned file system metadata snapshot tree corresponding to the particular moment in time may be mounted to provide the user associated with the primary storage system with read and/or write access to the plurality of files prior to the contents of the plurality of files being restored to the primary storage system.

In some embodiments, the secondary storage system sends corresponding file relocation metadata for each file stored on the primary storage system at the particular moment in time. The file relocation metadata corresponding to a file may include information which can be used to locate the file, such as an absolute path name for the file, a location of the file (e.g., a location on the secondary storage system or cloud storage system(s)), etc. In some embodiments, in response to receiving the corresponding file relocation metadata for each file stored on the primary storage system at the particular moment in time, the primary storage system generates a corresponding file relocation object (e.g., symbolic link, stub file, etc.) for each of the files stored on the primary storage system at the particular moment in time. The file relocation object may include the file relocation metadata. The primary storage system may generate the plurality of file relocation objects within a short period of time (e.g., milliseconds, seconds). In some embodiments, the primary storage system includes a filter driver and in response to receiving the corresponding file relocation metadata for each file stored on the primary storage system at the particular moment in time, the filter driver of the primary storage system maintains the corresponding file relocation metadata for each file stored on the primary storage system at the particular moment in time. After generating a plurality of file relocation objects or maintaining the file relocation metadata, the plurality of files corresponding to the received file relocation metadata are accessible on the primary storage system.

After the plurality of files are accessible on the primary storage system, the primary storage system may receive a request for a file. In some embodiments, the primary storage system stores a file relocation object associated with the requested file.

In some embodiments, in response to a request for the file from a requesting entity, the primary storage system reads the file relocation object for the file to identify a storage system storing the data associated with the requested file and provides to the requesting entity a link to the storage system storing the data associated with the requested file.

In some embodiments, in response to a request for the file from a requesting entity, the primary storage system reads the file relocation object associated with the requested file and redirects the request to a storage system storing the data associated with the requested file. The file relocation object may include a storage location associated with the requested file. In some embodiments, the storage system storing the data associated with the requested file is a secondary storage system and the redirect causes the secondary storage system to use a tree data structure (e.g., a file system metadata snapshot tree and a file metadata structure corresponding to the file) to locate the data associated with the requested file. This enables the secondary storage system to efficiently locate and provide the data associated with the requested file.

In some embodiments, the primary storage system uses a filter driver to enable retrieval of the requested file. The filter driver may maintain file relocation metadata for a file and in response to a request for the file from a requesting entity, the filter driver intercepts the request, reads the file relocation metadata, retrieves the data associated with the file from a location included in the file relocation metadata, and provides the data associated with the requested file to the requesting entity.

Using file relocation metadata to restore a primary storage system significantly reduces the amount of time needed to restore the primary storage system to an accessible state. In some embodiments, the amount of time needed to restore the primary storage system to an accessible state is reduced from the amount of time needed by the secondary storage system to send to the primary storage system all of the data associated with the plurality of files to the amount of time needed by the secondary storage system to generate the corresponding file relocation metadata for each file stored on the primary storage system at the particular moment in time and to send to the primary storage system the corresponding file relocation metadata for each file stored on the primary storage system at the particular moment in time, and for the primary storage system to generate and store the plurality of file relocation objects.

In some embodiments, the amount of time needed to restore the primary storage system to an accessible state is reduced from the amount of time needed by the secondary storage system to send to the primary storage system all of the data associated with the plurality of files to the amount of time needed by the secondary storage system to generate the corresponding file relocation metadata for each file stored on the primary storage system at the particular moment in time and to send the corresponding file relocation metadata for each file stored on the primary storage system at the particular moment in time to the primary storage system and for the primary storage system to configure the filter driver to maintain the corresponding file relocation metadata for each file stored on the primary storage system at the particular moment in time.

The secondary storage system may use the source metadata and/or the inferred metadata associated with the plurality of files that were stored on the primary storage system at the particular moment in time to determine which files should remain on the secondary storage system and which files should be restored to the primary storage system. For the files that are determined to be restored to the primary storage system, the secondary storage system may use the source metadata and/or the inferred metadata to determine an optimal sequence of restoring files from the secondary storage system to the primary storage system. In some embodiments, the secondary storage system restores all of the files that were stored on the primary storage system at the particular moment in time. The secondary storage system may use the source metadata and/or inferred metadata associated with all of the files backed up from the primary storage system to the secondary storage system at the particular moment in time to determine an order in which all of the files that were stored on the primary storage system at the particular moment in time are to be restored to the primary storage system. A tiering policy may indicate that a first file with a more recent modification timestamp is to be restored before a second file with a later modification timestamp. A tiering policy may indicate that a third file that is accessed more frequently than a fourth file is to be restored before the fourth file.

In some embodiments, the secondary storage system restores some of the files that were stored on the primary storage system at the particular moment in time. The secondary storage system may tier files stored on the primary storage system using a hierarchical storage tier management plan that is based on one or more tiering policies. A tiering policy may be applied to the metadata associated with the file to determine whether to restore the file from the secondary storage system to the primary storage system.

For example, a tiering policy may indicate that files that have been created, accessed, modified (e.g., data associated with a file or metadata associated with the file) within a particular time period are to be restored to the primary storage system. The tiering policy may also indicate an order of the files that are restored. A file system metadata snapshot tree is configured to store the metadata associated with a file (source and/or inferred). The secondary storage system may traverse the file system metadata snapshot trees associated with the particular time period to identify the one or more files that have been created, accessed, or modified within the particular time period.

In another example, a tiering policy may indicate that files that have been accessed or modified more than a threshold number of times within a particular time period are to be restored to the primary storage system. The secondary storage system may traverse the file system metadata snapshot trees associated with the particular time period to determine an estimated number of times a file has been accessed or modified within the particular time period. For each file, the secondary storage system may compare the estimated number of times the file has been accessed or modified within the particular time period to the threshold number to identify one of more files that were accessed or modified more than the threshold number of times within the particular time period.

After the one or more files are identified, the secondary storage system may restore the one or more identified files by sending to the primary storage system the data associated with the one or more identified files. The secondary storage system may use the source metadata and/or inferred metadata associated with all of the one or more identified files backed up from the primary storage system to the secondary storage system at the particular moment in time to determine an order in which the one or more identified files are to be restored to the primary storage system. A tiering policy may indicate that a first file with a more recent modification timestamp is to be restored before a second file with a later modification timestamp. A tiering policy may indicate that a third file that is accessed more frequently than a fourth file is to be restored before the fourth file.

In some embodiments, in response to receiving data associated with a file (e.g., a full content version), the primary storage system stores the data associated with the file, replaces the file relocation object corresponding to the file with the file, and deletes the file relocation object corresponding to the file. In some embodiments, in response to receiving data associated with the file, the primary storage system stores the data associated with the file and the filter driver no longer maintains the file relocation metadata corresponding to the restored file. The primary storage system may continue to store corresponding file relocation metadata objects or maintain file relocation metadata for the one or more files that are not restored. Using file relocation metadata and restoring a subset of the plurality of files stored by the primary storage system not only enables a plurality of files to be accessible in a short period of time (e.g., seconds, minutes), but also enables the secondary storage system to make tiering decisions for the primary storage system as part of a restoration process. In some embodiments, the primary storage system requests the data associated with the file. In some embodiments, the secondary storage system sends to the primary storage system a request to restore data and the primary storage system requests data associated with one or more files. This is an efficient use of resources because the resources that would have been used to restore one or more files that would have been tiered to a different storage tier are not used by the primary storage system and secondary storage system, and such resources may be used for other purposes. This may improve the overall performance of both the primary storage system and the secondary storage system.

FIG. 1 is a block diagram illustrating an embodiment of a system for restoring files. In the example shown, system 100 includes a client device 102, a primary storage system 112, a secondary storage system 122, and one or more cloud storage systems 132. In some embodiments, a file may be stored in one of the primary storage system 112, secondary storage system 122, and/or the one or more cloud storage systems 132.

Client device 102 may be a mobile phone, a smart phone, a tablet, a laptop computer, a desktop computer, a server, a smart watch, etc. Client device 102 includes an application 103. Application 103 may send a request for a file to primary storage system 112. The request may be sent via a network connection. The network connection may be wired or wireless. The network may be the Internet, an intranet, a local area network, a home area network, a wide area network, a cellular network, a virtual private network, etc.

In some embodiments, primary storage system 112 includes an application or process (not shown). The application or process may receive from a user associated with primary storage system 112 a request for a file; in another example, the application or process may programmatically request a file from primary storage system 112.

In response to receiving a request for a file, primary storage system 112 may provide the data associated with the requested file if the requested file is stored on primary storage system 112 or enable retrieval of data associated with the requested file. Primary storage system 112 may store a file relocation object (e.g., symbolic link, stub file, etc.) for the requested file. The file relocation object may enable retrieval of the requested file at a storage system storing the data associated with the requested file. In some embodiments, primary storage system 112 uses an agent (not shown) to enable retrieval of the requested file. In some embodiments, primary storage system 112 enables retrieval of the requested file without using an agent. In some embodiments, primary storage system 112 uses a filter driver (not shown) to enable retrieval of the requested file. In some embodiments, the data associated with the requested file is stored on secondary storage system 122 or one of the one or more cloud storage systems 132.

In some embodiments, primary storage system 112 stores a file relocation object for a file and in response to a request for the file from a requesting entity (e.g., client device 102, application 103, an application, process, or service running on primary storage system 112), primary storage system 112 reads the file relocation object associated with the requested file and redirects the request to a storage system storing the data associated with the requested file. In some embodiments, the storage system storing the data associated with the requested file is secondary storage system 122 and the redirect causes secondary storage system 122 to use a tree data structure (e.g., a file system metadata snapshot tree and a file metadata structure corresponding to the file) to locate the data associated with the requested file. This enables secondary storage system 122 to efficiently locate and provide the data associated with the file.

In some embodiments, primary storage system 112 stores a file relocation object for the file and in response to a request for the file from a requesting entity, the primary storage system 112 reads the file relocation object for the file to identify a storage system storing the data associated with the requested file and provides to the requesting entity a link to the storage system storing the data associated with the requested file.

In some embodiments, a filter driver of primary storage system 112 maintains file relocation metadata for a file and in response to a request for the file from a requesting entity (e.g., client device 102, application 103, an application, process, or service running on primary storage system 112), the filter driver intercepts the request, reads the file relocation metadata, retrieves the data associated with the file from a location included in the file relocation metadata, and provides the data associated with the requested file to the requesting entity.

Primary storage system 112 is a computing system that stores file system data. The file system data includes data associated with a plurality of files and the metadata associated with each of the files. For example, the metadata associated with each of the files may include access control information and historical information. Access control information may include the owner of the file, the creator of the file, the last modifier of the file, users or groups allowed read, write, modify access to the file, and more. Historical information may include a creation time, a last edited time, a last read time, a last access time, etc. Primary storage system 112 may be comprised of one or more servers, one or more computing devices, one or more storage devices, and/or combinations thereof.

A backup snapshot of primary storage system 112 may be received by secondary storage system 122. For example, primary storage system 112 may perform a backup snapshot of its file system data and send the file system data to secondary storage system 122. In some embodiments, primary storage system 112 sends the file system data to secondary storage system 122 without a request from secondary storage system 122 (e.g., backup snapshots are performed according to a schedule). In some embodiments, primary storage system 112 sends the file system data to secondary storage system 122 in response to a request from secondary storage system 122. The backup snapshot may be a full backup snapshot or an incremental backup snapshot. A full backup snapshot includes all of the file system data associated with primary storage system 112. The file system data included in the full backup snapshot includes metadata associated with the plurality of files that are stored on primary storage system 112. An incremental backup snapshot includes all of the file system data associated with the primary storage system that was not included in a previous backup snapshot. The file system data included in the incremental backup snapshot includes metadata associated with the one or more files that were modified and/or added since a previous backup snapshot. Primary storage system 112 may include a backup agent (not shown) that is configured to cause primary storage system 112 to perform a backup snapshot (e.g., a full backup snapshot or incremental backup snapshot). In some embodiments, primary storage system 112 includes a backup function and is configured to perform a backup snapshot on its own without a backup agent. In some embodiments, secondary storage system 122 may provide instructions to primary storage system 112, causing primary storage system 112 to execute backup functions without a backup agent.

Secondary storage system 122 is comprised of a plurality of storage nodes 121, 123, 125. Although three storage nodes are shown, secondary storage system 122 may be comprised of n storage nodes. The plurality of storage nodes may be comprised of one or more solid state drives, one or more hard disk drives, or a combination thereof. Each storage node may have its own corresponding processor. In some embodiments, secondary storage system 122 may be configured to ingest a backup snapshot received from primary storage system 112 and configured to store the data associated with the backup snapshot across the storage nodes 121, 123, 125. In some embodiments, secondary storage system 122 is a cloud instantiation of a storage system. For example, the cloud instantiation of secondary storage system 122 may be comprised of three virtual nodes, each virtual node with a storage capacity of 10 TB. In some embodiments, secondary storage system 122 is configured to ingest and store a backup snapshot received from primary storage system 112. In some embodiments, secondary storage system 122 may comprise replicas of some or all of its system components (e.g., nodes, file manager 126, file tier agent 127, metadata store 124) disposed in a cloud instantiation; the cloud instantiation may comprise a replica of the data stored by secondary storage system 122.

Secondary storage system 122 may include a file manager 126 that is configured to organize the file system data of the backup snapshot using a tree data structure. An example of the tree data structure is a file system metadata snapshot tree, which may be based on a B+ tree structure (or other type of tree structure in other embodiments). Secondary storage system 122 may store a plurality of tree data structures in metadata store 124. Secondary storage system 122 may generate a file system metadata snapshot tree and one or more file metadata structures for each backup snapshot.

The tree data structure may be used to capture different backup snapshots. The tree data structure allows a chain of file system metadata snapshot trees to be linked together by allowing a node of a later version of a file system metadata snapshot tree to reference a node of a previous version of a file system metadata snapshot tree. The previous version of the file system metadata snapshot tree may correspond to an earlier backup snapshot. For example, a root node or an intermediate node of a file system metadata snapshot tree corresponding to a second backup snapshot may reference an intermediate node or leaf node of a file system metadata snapshot tree corresponding to a first backup snapshot.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a file metadata structure, a pointer to a data chunk stored on the storage cluster, data associated with an inode, a pointer to a file stored in a different storage tier, etc.

A file metadata structure may include a root node, one or more levels of one or more intermediate nodes associated with the root node, and one or more leaf nodes associated with an intermediate node of the lowest intermediate level. The tree data structure associated with a file metadata structure allows a chain of file metadata structures corresponding to different versions of a file to be linked together by allowing a node of a later version of a file metadata structure to reference a node of a previous version of a file metadata structure. A file metadata structure is configured to store metadata that may be used to locate the data associated with a file.

A leaf node of a file metadata structure may store a value, such as an identifier of a data brick associated with one or more data chunks. The location of the one or more data chunks associated with a data brick may be identified using one or more data structures (e.g., list, table, etc.) stored in metadata store 124. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Primary storage system 112 may initially perform a full backup snapshot of its file system data and secondary storage system 122 is configured to receive and store the file system data, and generate a tree data structure that includes an initial file system metadata snapshot tree. Primary storage system 112 may subsequently perform one or more incremental backup snapshots of its file system data and in response, secondary storage system 122 updates the tree data structure to include one or more corresponding file system metadata snapshot trees. Primary storage system 112 is configured to perform a backup snapshot based on one or more backup policies. A backup policy may indicate that primary storage system 112 is to perform a backup snapshot (full or incremental) based on a schedule (e.g., every day), when a threshold amount of data has changed, in response to a user command, etc.

At some point in time, primary storage system 112 becomes corrupted and the plurality of files stored on primary storage system 112 are not accessible. Secondary storage system 122 may be used to restore primary storage system 112 to a point in time for which a backup snapshot was performed. Other systems may restore all of data associated with the plurality of files stored by primary storage system 112. However, restoring all of the data associated with the plurality of files stored by primary storage system 112 may take a long time to perform (e.g., hours, days, etc.). The plurality of files may not be accessible until all of the data associated with the plurality of files has been restored to primary storage system 112.

A user associated with primary storage system 112 may send to secondary storage system 122 a request to restore primary storage system 112 to a particular moment in time. In response to receiving the request, secondary storage system 122 may clone a file system metadata snapshot tree corresponding to the particular moment in time and use the file system metadata snapshot tree or the cloned file system metadata snapshot tree corresponding to the particular moment in time to identify a plurality of files that were stored on primary storage system 112 at the particular moment in time.

In some embodiments, secondary storage system 122 sends corresponding file relocation metadata for each file stored on primary storage system 112 at the particular moment in time. The file relocation metadata corresponding to a file may include information which can be used to locate the file, such as an absolute path name for the file, a location of the file (e.g., a location on secondary storage system 122 or cloud storage system(s) 132), etc. In some embodiments, in response to receiving the corresponding file relocation metadata for each file stored on primary storage system 112 at the particular moment in time, primary storage system 112 generates a corresponding file relocation object (e.g., symbolic link, stub file, etc.) for each of the files stored on primary storage system 112 at the particular moment in time. The file relocation object may include the file relocation metadata. The primary storage system may generate the plurality of file relocation objects within a short period of time (e.g., milliseconds, seconds).

In some embodiments, primary storage system 112 includes a filter driver and in response to receiving the corresponding file relocation metadata for each file stored on primary storage system 112 at the particular moment in time, the filter driver of primary storage system 112 maintains the corresponding file relocation metadata for each file stored on primary storage system 112 at the particular moment in time. After generating a plurality of file relocation objects or maintaining the file relocation metadata, the plurality of files corresponding to the received file relocation metadata are accessible on primary storage system 112.

After storing the plurality of file relocation objects or maintaining the file relocation metadata, the plurality of files corresponding to the file relocation objects or file relocation metadata are accessible to one or more users. A file may be accessible after its corresponding file relocation object is stored on primary storage system 112 or its corresponding file relocation metadata is maintained by a filter driver of primary storage system 112. In some embodiments, the plurality of files are accessible after all of the file relocation objects are stored on primary storage system 112 or after the filter driver of primary storage system 112 maintains all of the file relocation metadata for the plurality of files.

Using file relocation metadata to restore primary storage system 112 significantly reduces the amount of time needed to restore primary storage system 112 to an accessible state. In some embodiments, the amount of time needed to restore primary storage system 112 to an accessible state is reduced from the amount of time needed by secondary storage system 122 to send to primary storage system 112 all of the data associated with the plurality of files to the amount of time needed by secondary storage system 122 to generate the corresponding file relocation metadata for each file stored on primary storage system 112 at the particular moment in time and to send to primary storage system 112 the corresponding file relocation metadata for each file stored on primary storage system 112 at the particular moment in time, and for primary storage system 112 to generate and store the plurality of file relocation objects.

In some embodiments, the amount of time needed to restore primary storage system 112 to an accessible state is reduced from the amount of time needed by secondary storage system 122 to send to primary storage system 112 all of the data associated with the plurality of files to the amount of time needed by secondary storage system 122 to generate the corresponding file relocation metadata for each file stored on primary storage system 112 at the particular moment in time and to send the corresponding file relocation metadata for each file stored on primary storage system 112 at the particular moment in time to primary storage system 112 and for primary storage system 112 to configure the filter driver to maintain the corresponding file relocation metadata for each file stored on primary storage system 112 at the particular moment in time.

In some embodiments, file relocation metadata is used for migration purposes. For example, file relocation metadata may be used to migrate files from secondary storage system 122 to a different storage system (i.e., a system that is different than primary storage system 112). In some embodiments, secondary storage system 122 sends to the different storage system corresponding file relocation metadata for each file to be migrated to the different storage system. In response to receiving the corresponding file relocation metadata for each file to be migrated, the different storage system may generate the plurality of file relocation objects or use a filter driver to maintain the received file relocation metadata. After generating and storing the plurality of file relocation objects or using a filter driver to maintain the file relocation metadata, the plurality of files to be migrated are accessible on the different storage system. The order in which the plurality of files are migrated to the different storage system may be similar to the order used for restoration purposes as described herein.

In some embodiments, file relocation metadata is used for replication purposes. For example, file relocation objects may be used to make a state of a different storage system replicate a state of primary storage system 112 at a particular moment in time. In some embodiments, secondary storage system 122 sends to the different storage system (e.g., the storage system where the replica is stored) corresponding file relocation metadata for each file stored on primary storage system 112 at the particular moment in time. In response to receiving the corresponding file relocation metadata for each file to be replicated, the different storage system may generate the plurality of relocation objects or use a filter driver to maintain the received file relocation metadata. After generating and storing the plurality of file relocation objects or using a filter driver to maintain the file relocation metadata, the plurality of files to be replicated are accessible on the different storage system. The order in which the plurality of files are replicated to the different storage system may be similar to the order used for restoration purposes as described herein.

After one or more backup snapshots are performed, secondary storage system 122 may be configured to infer metadata associated with a file. The inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The source metadata associated with a file included in a plurality of backup snapshots is associated with a particular period of time to determine when events occurred on the file. For example, the first time a file is generated on primary storage system 112 and backed up to secondary storage system 122, a node of the file system metadata snapshot tree corresponding to the backup snapshot may store a creation time associated with the file. The file stored on the primary storage system may be subsequently edited. The data associated with the edited version of the file and the metadata associated with the edited version of the file may be included in a subsequent backup snapshot. The file system metadata snapshot tree corresponding to the subsequent backup snapshot may include source metadata, such as a modification time associated with the edited version of the file, read times, access times, whether and when access controls were changed, by whom, and who has access, etc., and/or inferred metadata, such as the estimated number of times the file was accessed or modified within a particular period of time. In some embodiments, the inferred metadata is stored in a data structure associated with a backup snapshot. The data structure associated with the backup snapshot may store one or more statistics associated with one or more files associated with a backup snapshot, such as the estimated number of times a file was accessed or modified within a particular period of time, etc.

File tier agent 127 may use the source metadata and/or inferred metadata associated with some or all of the files backed up from primary storage system 112 to secondary storage system 122 to determine which files should remain on secondary storage system 122 and which files should be restored to primary storage system 112. File tier agent 127 may tier files stored on primary storage system 112 using a hierarchical storage tier management plan that is based on one or more tiering policies. The one or more tiering policies may be applied to the metadata associated with a file to determine whether to restore the file from secondary storage system 122 to primary storage system 112. In some embodiments, the one or more tiering policies may be applied to the metadata associated with a file to determine whether to migrate the file from secondary storage system 122 to a different storage system.

For example, a tiering policy may indicate that files that have been created, accessed, or modified (e.g., data associated with a file or metadata associated with the file) within a particular time period are to be restored to primary storage system 112. File tier agent 127 may traverse the file system metadata snapshot trees associated with the particular time period to identify the one or more files that have not been created, accessed, or modified within the particular time period.

In another example, a tiering policy plan may indicate that files that have been accessed or modified more than a threshold number of times within a particular time period are to be restored to primary storage system 112. File tier agent 127 may traverse the file system metadata snapshot trees associated with the particular time period to determine an estimated number of times a file has been accessed or modified within the particular time period. For each file, the file tier agent 127 may compare the estimated number of times the file has been accessed or modified within the particular time period to the threshold number to identify one of more files that were accessed or modified more than the threshold number of times within the particular time period.

After the one or more files are identified by file tier agent 127, secondary storage system 122 may restore the one or more identified files by sending to primary storage system 112 the data associated with the one or more identified files. File tier agent 127 may use the source metadata and/or inferred metadata associated with all of the files backed up from primary storage system 112 to secondary storage system 122 at the particular moment in time to determine an order in which the one or more identified files are to be restored to primary storage system 112. A tiering policy may indicate that a first file with a more recent modification timestamp is to be restored before a second file with a later modification timestamp. A tiering policy may indicate that a third file that is accessed more frequently than a fourth file is to be restored before the fourth file.

In some embodiments, in response to receiving data associated with a file (e.g., a full content version), primary storage system 112 stores the data associated with the file, replaces the file relocation object corresponding to the file with the file, and deletes the file relocation object corresponding to the file. In some embodiments, in response to receiving data associated with the file, primary storage system 112 stores the data associated with the file and the filter driver no longer maintains the file relocation metadata corresponding to the restored file. In some embodiments, primary storage system 112 requests the data associated with the file. In some embodiments, secondary storage system 122 sends to primary storage system 112 a request to restore data and primary storage system 112 requests data associated with one or more files. Primary storage system 112 may continue to store corresponding file relocation metadata objects or maintain file relocation metadata for the one or more files that are not restored.

In some embodiments, a backup snapshot is received from primary storage system 112 with little or no metadata. For example, primary storage system 112 may perform a backup snapshot that includes data associated with a plurality of files, but metadata associated with the plurality of files (e.g., access control information and historical information) is not included in the backup snapshot. As discussed above, secondary storage system 122 may infer metadata associated with the plurality of files. Secondary storage system 122 may use the inferred metadata associated with the plurality of files to determine whether a file is to be restored from secondary storage system 122 to primary storage system 112.

In some embodiments, primary storage system 112 performs a backup snapshot and secondary storage system 122 ingests and stores the metadata associated with the backup snapshot. Instead of storing the data associated with a file, secondary storage system 122 may determine to back up the data associated with the file to cloud storage system(s) 132. The data associated with the file may be backed up from primary storage system 112 to cloud storage system(s) 132. As discussed above, secondary storage system 122 may infer metadata associated with the plurality of files. Secondary storage system 122 may use the source metadata and/or the inferred metadata associated with the plurality of files to determine whether a file is to be restored from cloud storage system(s) 132 to primary storage system 112.

Figure 2A:
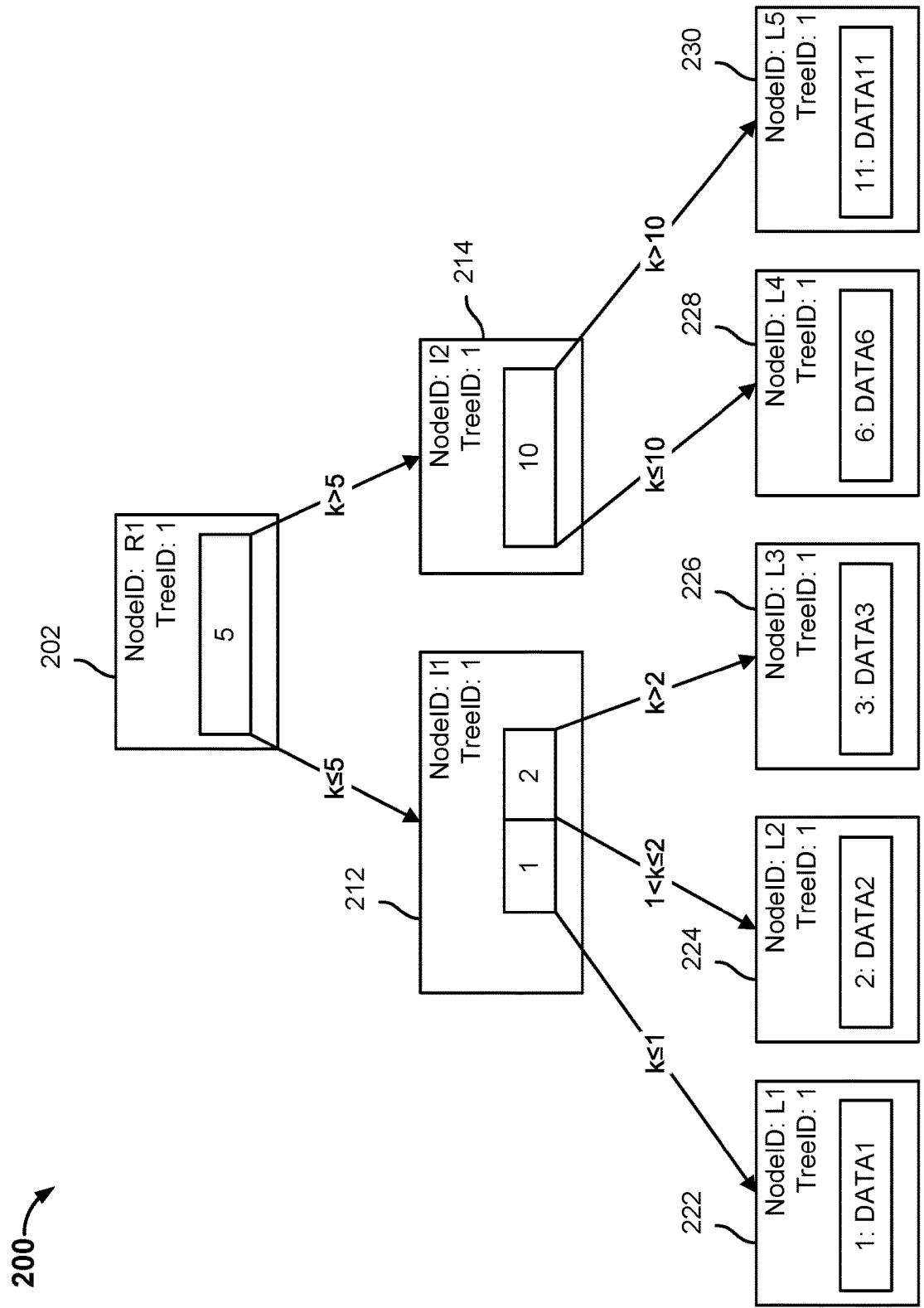
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as secondary storage system 122. A file system manager, such as file manager 126, may generate tree data structure 200. Tree data structure 200 may correspond to a full backup snapshot.

Tree data structure 200 is comprised of a file system metadata snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time to. The backup snapshot may be received from a primary storage system, such as primary storage system 112. The file system metadata snapshot tree in conjunction with a plurality of file metadata structures may provide a complete view of the primary system associated with the backup snapshot for the particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. Each node of the tree structure includes a view identifier of a view with which the node is associated (e.g., TreeID). The view identifier is associated with a particular moment in time (e.g., when a backup snapshot is performed).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be associated with one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key. In some embodiments, a leaf node is configured to store the data associated with a file when the size of the file is less than or equal to a limit size (e.g., 256 kB). In some embodiments, a leaf node includes a pointer to a file metadata structure (e.g., blob structure) when the size of data associated with a file is larger than the limit size. In some embodiments, a leaf node corresponds to an inode. In some embodiments, a leaf node stores metadata associated with a file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata. In other embodiments, leaf node 222 is configured to store file data when the size of the file is less than or equal to a limit size. In other embodiments, leaf node 222 is a directory inode and is configured to store a pointer to or an identifier of one or more other leaf nodes. In other embodiments, leaf node 222 is a file inode and is configured to store a pointer to or an identifier of a file metadata structure. In some embodiments, leaf node 222 stores metadata associated with a file.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata. In other embodiments, leaf node 224 is configured to store file data when the size of the file is less than or equal to a limit size. In other embodiments, leaf node 224 is a file inode and is configured to store a pointer to or an identifier of a file metadata structure. In some embodiments, leaf node 224 stores metadata associated with a file.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata. In other embodiments, leaf node 226 is configured to store file data when the size of the file is less than or equal to a limit size. In other embodiments, leaf node 226 is a directory inode and is configured to store a pointer to or an identifier of one or more other leaf nodes. In other embodiments, leaf node 226 is a file inode and is configured to store a pointer to or an identifier of a file metadata structure. In some embodiments, leaf node 226 stores metadata associated with a file.

Leaf node 228 includes a data key-value pair of "6: DATA6." Leaf node 228 includes NodeID of "L4" and a TreeID of "1." To view the value associated with a data key of "6," tree data structure 200 is traversed from root node 202 to intermediate node 214 to leaf node 228. In some embodiments, leaf node 228 is configured to store metadata. In other embodiments, leaf node 228 is configured to store file data when the size of the file is less than or equal to a limit size. In other embodiments, leaf node 228 is a directory inode and is configured to store a pointer to or an identifier of one or more other leaf nodes. In other embodiments, leaf node 228 is a file inode and is configured to store a pointer to or an identifier of a file metadata structure. In some embodiments, leaf node 228 stores metadata associated with a file.

Leaf node 230 includes a data key-value pair of "11: DATA11." Leaf node 230 includes NodeID of "L5" and a TreeID of "1." To view the value associated with a data key of "11," tree data structure 200 is traversed from root node 202 to intermediate node 214 to leaf node 230. In some embodiments, leaf node 230 is configured to store metadata. In other embodiments, leaf node 230 is configured to store file data when the size of the file is less than or equal to a limit size. In other embodiments, leaf node 230 is a directory inode and is configured to store a pointer to or an identifier of one or more other leaf nodes. In other embodiments, leaf node 230 is a file inode and is configured to store a pointer to or an identifier of a file metadata structure. In some embodiments, leaf node 230 stores metadata associated with a file.

Figure 2B:
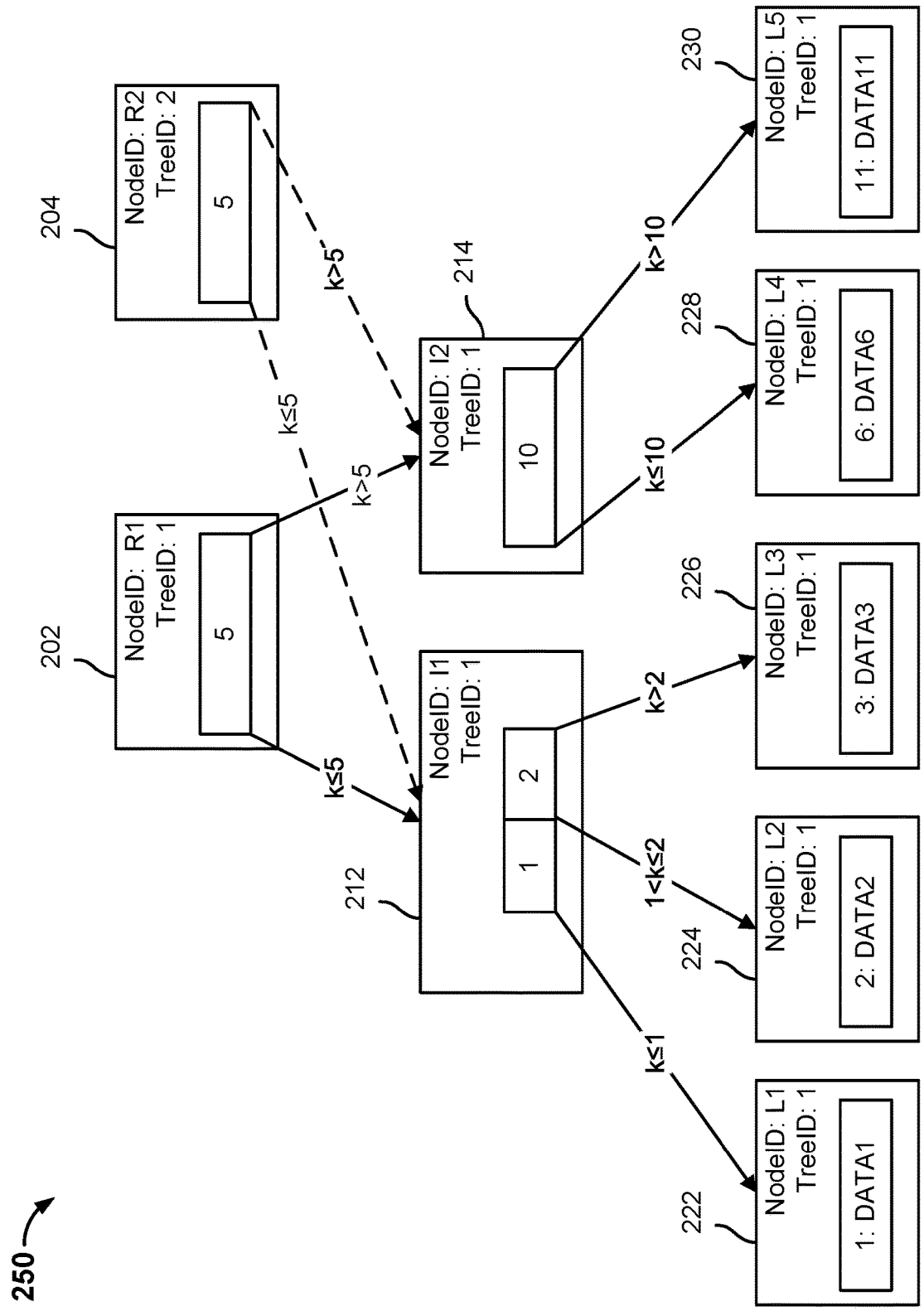
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure (e.g., when a backup snapshot is performed), when data associated with a file system metadata snapshot tree is migrated, when data associated with a file system metadata snapshot tree is restored, when data associated with a file system metadata snapshot tree is replicated, when data associated with a file system metadata snapshot tree is used for test/development purposes, etc. In some embodiments, tree data structure 250 may be created by a storage system, such as secondary storage system 122. The file system data of a primary storage system, such as primary storage system 112, may be backed up to a storage system, such as secondary storage system 122. A subsequent backup snapshot may correspond to an incremental backup snapshot. The tree data structure corresponding to the subsequent backup snapshot is generated in part by cloning a file system metadata snapshot tree associated with a previous backup snapshot.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a file system metadata snapshot tree included in the tree data structure. In some embodiments, the tree data structure allows a chain of backup snapshot versions (i.e., file system metadata snapshot trees) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a file system metadata snapshot tree corresponding to an incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
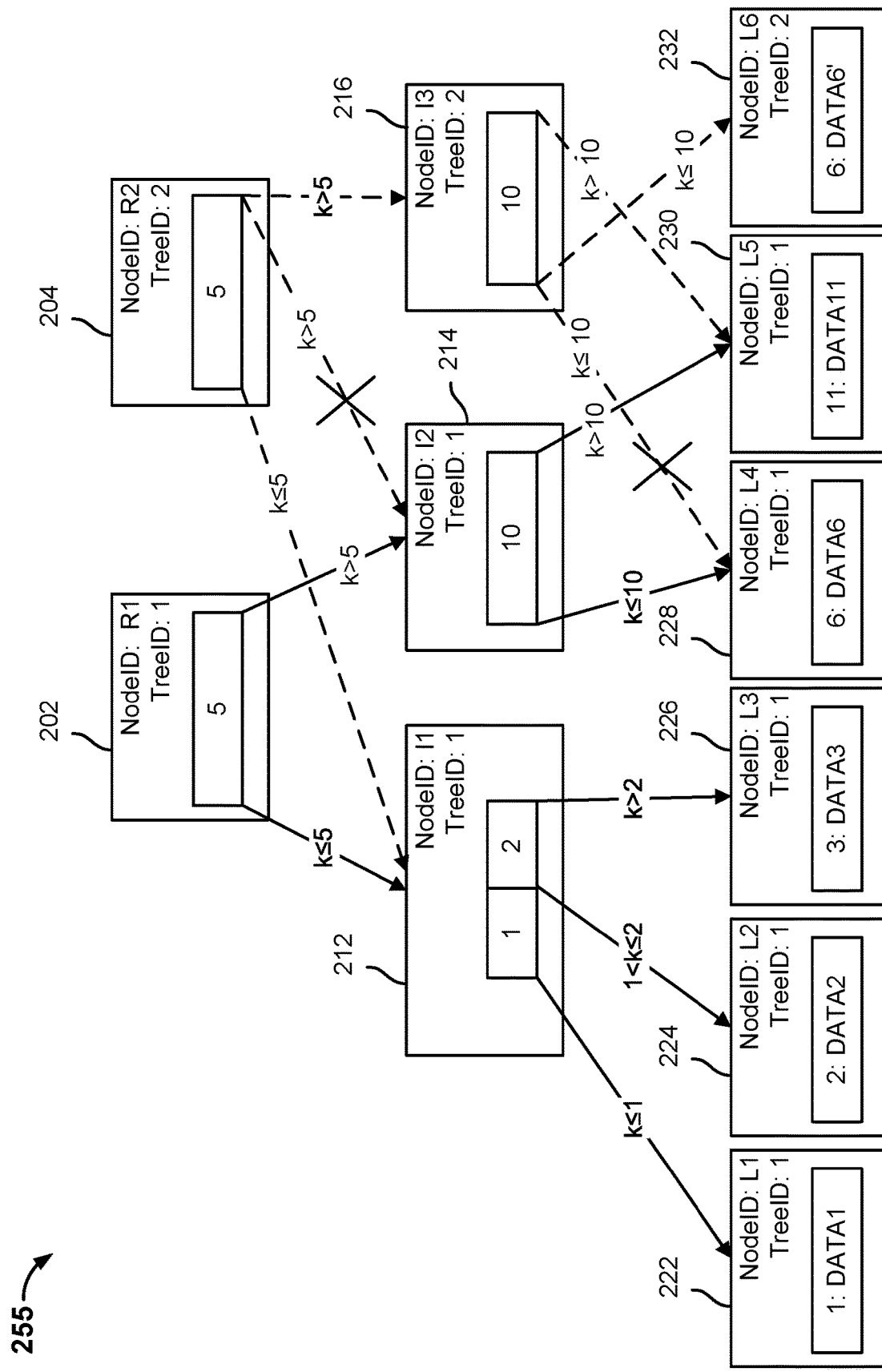
FIG. 2C is a block diagram illustrating an embodiment of modifying a cloned file system metadata snapshot tree.

FIG. 2C is a block diagram illustrating an embodiment of modifying a cloned file system metadata snapshot tree. In the example shown, tree data structure 255 may be modified by a file manager, such as file manager 126. A file system metadata snapshot tree with a root node 204 may be a current view of the file system data, for example, at time $t_1$.

In the example shown, the value "DATA6" has been modified to be "DATA6'" In some embodiments, the value of a key value pair has been modified. In other embodiments, the value of the key value pair is the file data associated with a file that is smaller than or equal to a limit size. In other embodiments, the value of the key value pair points to a different file metadata structure (e.g., a metadata structure corresponding to a different version of a file). The different file metadata structure may be a modified version of the file metadata structure to which the leaf node previously pointed. In some embodiments, the value of the key value pair no longer points to another node to which the node pointed.

To modify the file system metadata snapshot tree at $t_1$, the file system manager starts at root node 204 because that is the root node associated with the file system metadata snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6'" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a file that is smaller than or equal to a limit size.

Figure 2D:
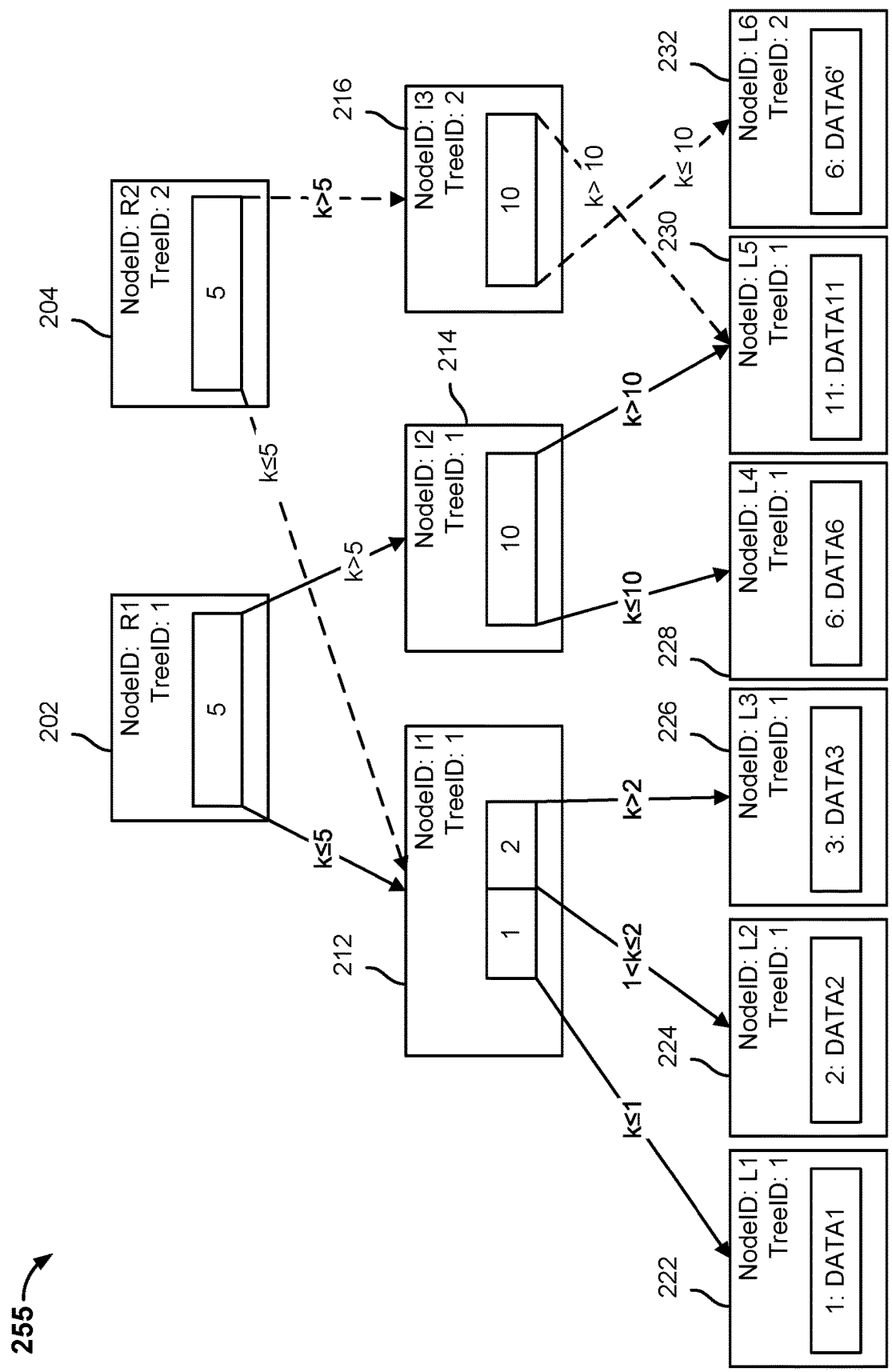
FIG. 2D is a block diagram illustrating an embodiment of a modified file system metadata snapshot tree.

FIG. 2D is a block diagram illustrating an embodiment of a modified file system metadata snapshot tree. Tree data structure 255 shown in FIG. 2D illustrates a result of the modifications made to a file system metadata snapshot tree as described with respect to FIG. 2C.

Figure 3A:
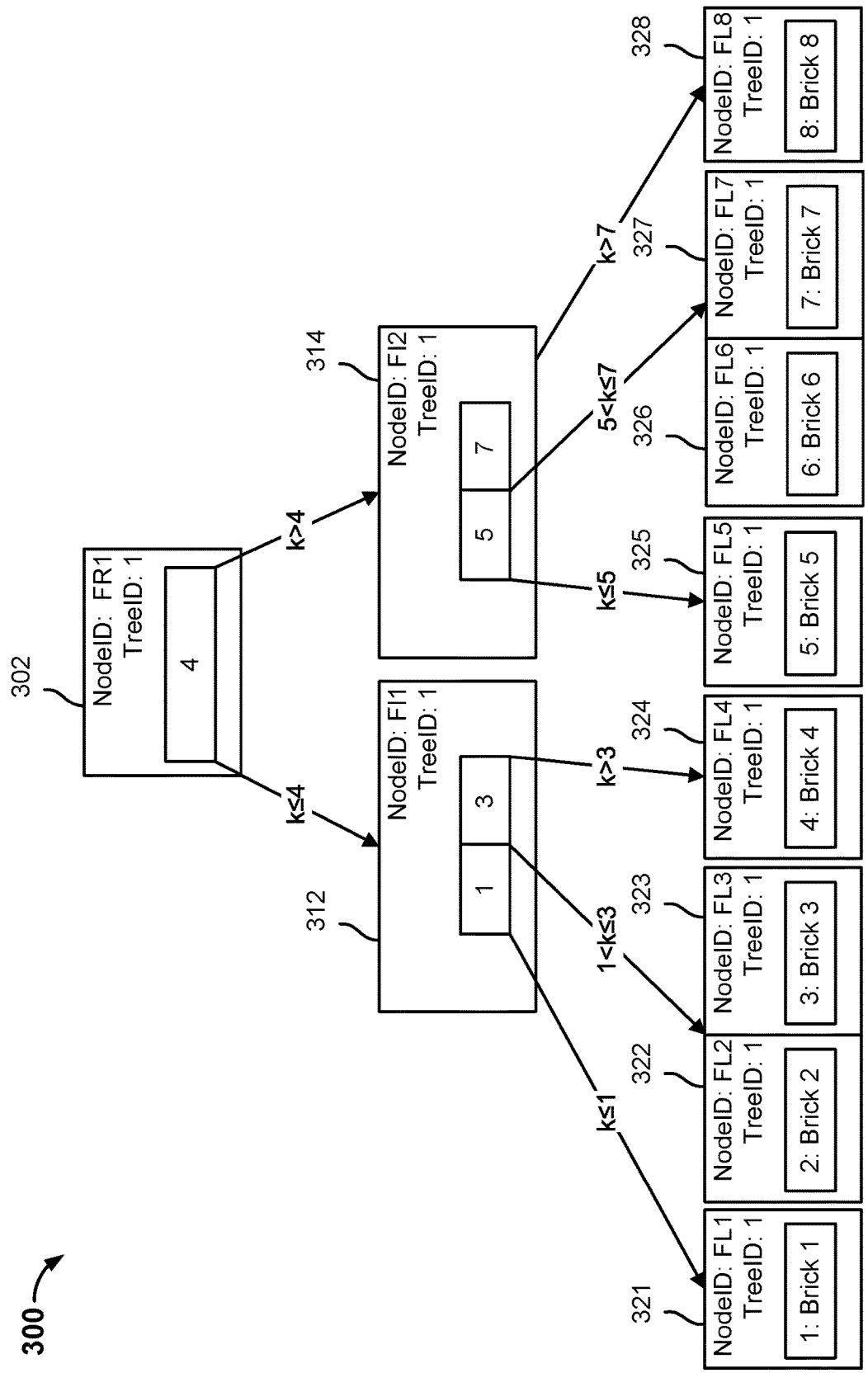
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 122. In the example shown, tree data structure 300 corresponds to a file and stores the file metadata associated with the file. The file metadata associated with a file may be stored by a storage system separate from the contents of the file, that is, the tree data structure storing the file metadata associated with a file is stored separately from the contents of the file. For example, the contents of the file may be stored on a hard disk drive, while tree data structure 300 that holds the file metadata may be stored in storage with faster access times, such as a solid state drive (SSD) of a storage node.

A leaf node of a file system metadata snapshot tree associated with file system data, such as a leaf node of tree data structures 200, 250, 255, may include a pointer to a tree data structure that stores metadata corresponding to a file, such as tree data structure 300.

A tree data structure corresponding to a file at a particular point in time (e.g., a particular version) may be comprised of a root node, one or more levels of one or more intermediate nodes, and one or more leaf nodes. In some embodiments, a tree data structure corresponding to a file is comprised of a root node and one or more leaf nodes without any intermediate nodes. Tree data structure 300 may be a snapshot of a file at a particular point in time t, for example at time $t_0$. Tree data structure 300 may correspond to a full backup of a file.

In the example shown, tree data structure 300 includes file root node 302, file intermediate nodes 312, 314, and file leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the file). The view identifier is associated with a particular moment in time (e.g., when a backup snapshot is performed). Root node 302 includes pointers to intermediate nodes 312, 314. Root node 302 includes a NodeID of "FR1" and a TreeID of "1."

In the example shown, intermediate node 312 includes respective pointers to leaf nodes 321, 322, 323, 324. Intermediate node 312 includes a NodeID of "FI" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "FI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a file corresponding to tree data structure 300. Leaf node 321 includes NodeID of "FL1" and a TreeID of "1."

Leaf node 322 includes a data key-value pair of "2: Brick 2." "Brick 2" is a brick identifier that identifies the data brick associated with one or more data chunks of a file corresponding to tree data structure 300. Leaf node 322 includes NodeID of "FL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of a file corresponding to tree data structure 300. Leaf node 323 includes NodeID of "FL3" and a TreeID of "1."

Leaf node 324 includes a data key-value pair of "4: Brick 4." "Brick 4" is a brick identifier that identifies the data brick associated with one or more data chunks of a file corresponding to tree data structure 300. Leaf node 324 includes NodeID of "FL4" and a TreeID of "1."

Leaf node 325 includes a data key-value pair of "5: Brick 5." "Brick 5" is a brick identifier that identifies the data brick associated with one or more data chunks of a file corresponding to tree data structure 300. Leaf node 325 includes NodeID of "FL5" and a TreeID of "1."

Leaf node 326 includes a data key-value pair of "6: Brick 6." "Brick 6" is a brick identifier that identifies the data brick associated with one or more data chunks of a file corresponding to tree data structure 300. Leaf node 326 includes NodeID of "FL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a file corresponding to tree data structure 300. Leaf node 327 includes NodeID of "FL7" and a TreeID of "1."

Leaf node 328 includes a data key-value pair of "8: Brick 8." "Brick 8" is a brick identifier that identifies the data brick associated with one or more data chunks of a file corresponding to tree data structure 300. Leaf node 328 includes NodeID of "FL8" and a TreeID of "1."

A file may be comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 124, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
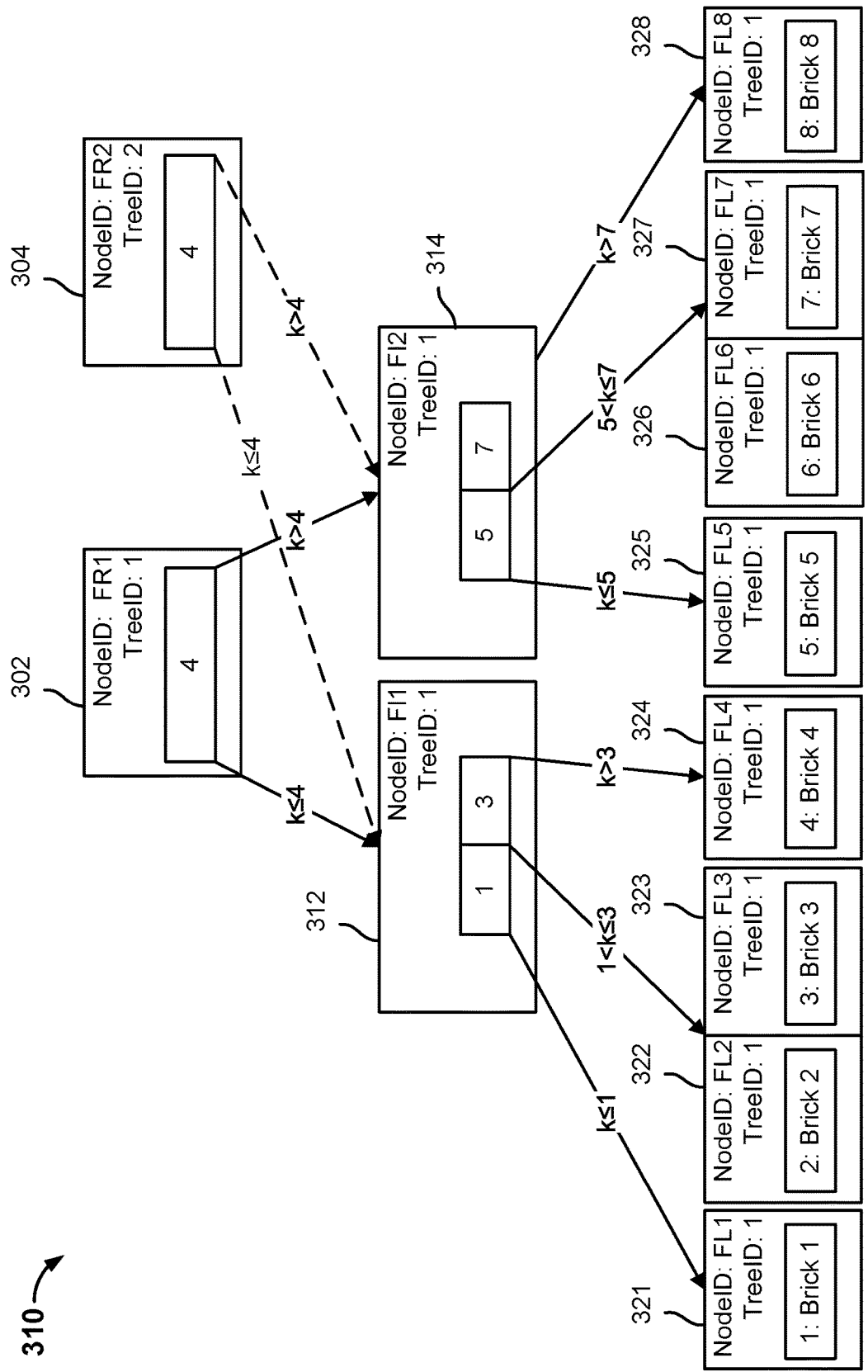
FIG. 3B is a block diagram illustrating an embodiment of a cloned metadata structure.

FIG. 3B is a block diagram illustrating an embodiment of a cloned metadata structure. A metadata structure may be cloned when a subsequent version of a file is stored on a storage system. In some embodiments, tree data structure 310 may be created by a storage system, such as storage system 112. The tree data structure corresponding to a file can be used to capture different versions of a workload, a workload file, or a file at different moments in time. In some embodiments, the tree data structure allows a chain of file metadata structures corresponding to different versions of a file to be linked together by allowing a node of a later version of a file metadata structure to reference a node of a previous version of a file metadata structure. The file metadata structure corresponding to a subsequent version of a file may be generated in part by cloning the file metadata structure corresponding to a previous version of a file.

A root node or an intermediate node of a version of a file metadata structure may reference an intermediate node or a leaf node of a previous version of a file metadata structure.

Similar to the file system metadata snapshot tree, the file metadata structure allows different versions of a file to share nodes and allows changes to a file to be tracked. When a backup snapshot is received, a root node of the file metadata structure may be linked to one or more intermediate nodes associated with a previous file metadata structure. This may occur when data associated with a file is included in both versions of the file.

In the example shown, tree data structure 310 includes a first file metadata structure comprising root node 302, intermediate nodes 312, 314, and leaf nodes 321, 322, 323, 324, 325, 326, 327, 328. Tree data structure 310 also includes a second file metadata structure that may be a snapshot of file data at a particular point in time, for example at time $t_1$. The second file metadata structure is comprised of root node 304, intermediate nodes 312, 314, and leaf nodes 321, 322, 323, 324, 325, 326, 327, 328. To create a snapshot of the file data at time a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the file metadata structure at a particular moment in time. The TreeID of a root node indicates a view with which the root node is associated (e.g., file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a file metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a file metadata structure included in tree data structure 310 from root node 304 to intermediate node 314 leads to a leaf node with a data key of "5," "6," "7," or "8." Root node 304 includes a NodeID of "FR2" and a TreeID of "2."

Figure 3C:
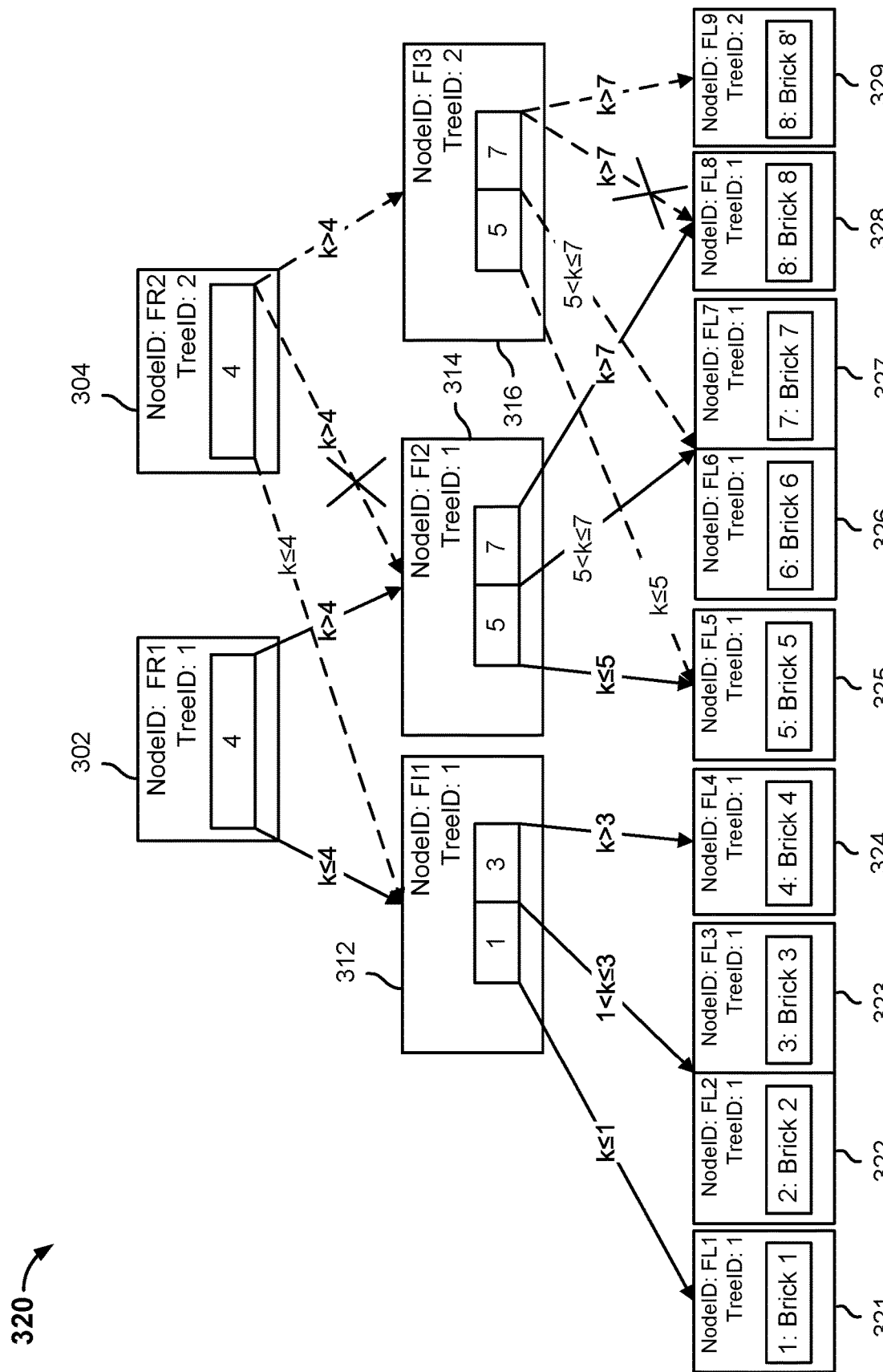
FIG. 3C is a block diagram illustrating an embodiment of modifying a cloned file metadata structure.

FIG. 3C is a block diagram illustrating an embodiment of modifying a cloned file metadata structure. Tree data structure 320 is comprised of a first file metadata structure that includes root node 302 and a second metadata structure that includes root node 304. In the example shown, tree data structure 320 may be modified by a file system manager, such as file manager 126.

In some embodiments, the file data associated with a file may be modified such that one of the data chunks is replaced by another data chunk. When a data chunk of file data associated with a previous backup snapshot is replaced with a new data chunk, the data brick associated with the new data chunk may be different. A leaf node of a file metadata structure stores a brick identifier of a data brick that is associated with a data chunk. To represent this modification to the file data, a corresponding modification is made to a current view of a file metadata structure. The current view of the file metadata structure is modified because the previous file metadata structure is a snapshot view and can no longer be modified. The data chunk of the file data that was replaced has a corresponding leaf node in the previous file metadata structure. A new leaf node in the current view of the file metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the file metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
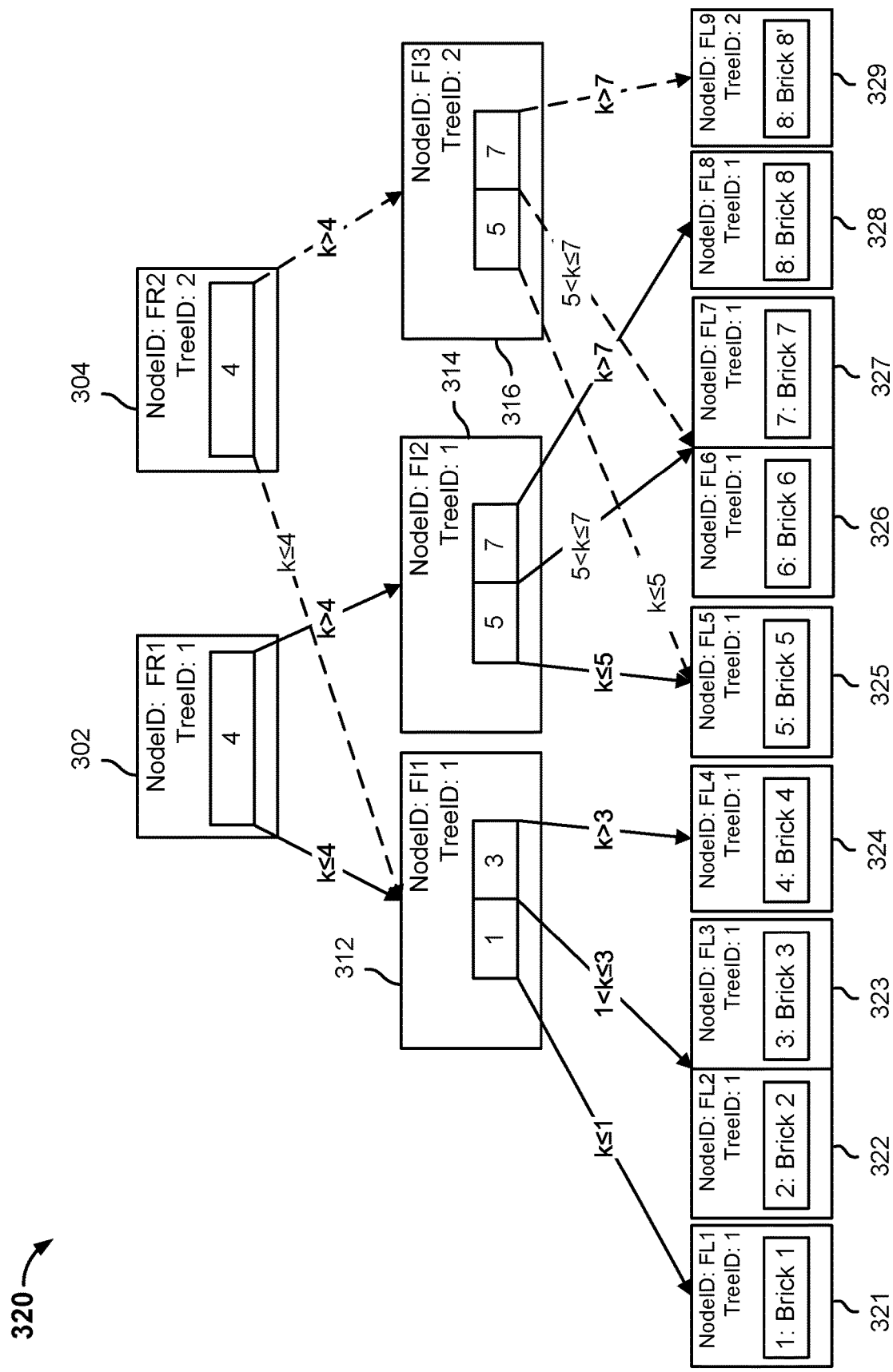
FIG. 3D is a block diagram illustrating an embodiment of a modified file metadata structure.

FIG. 3D is a block diagram illustrating an embodiment of a modified file metadata structure. The tree data structure 320 shown in FIG. 3D illustrates a result of the modifications made to tree data structure 310 as described with respect to FIG. 3C.

Figure 4:
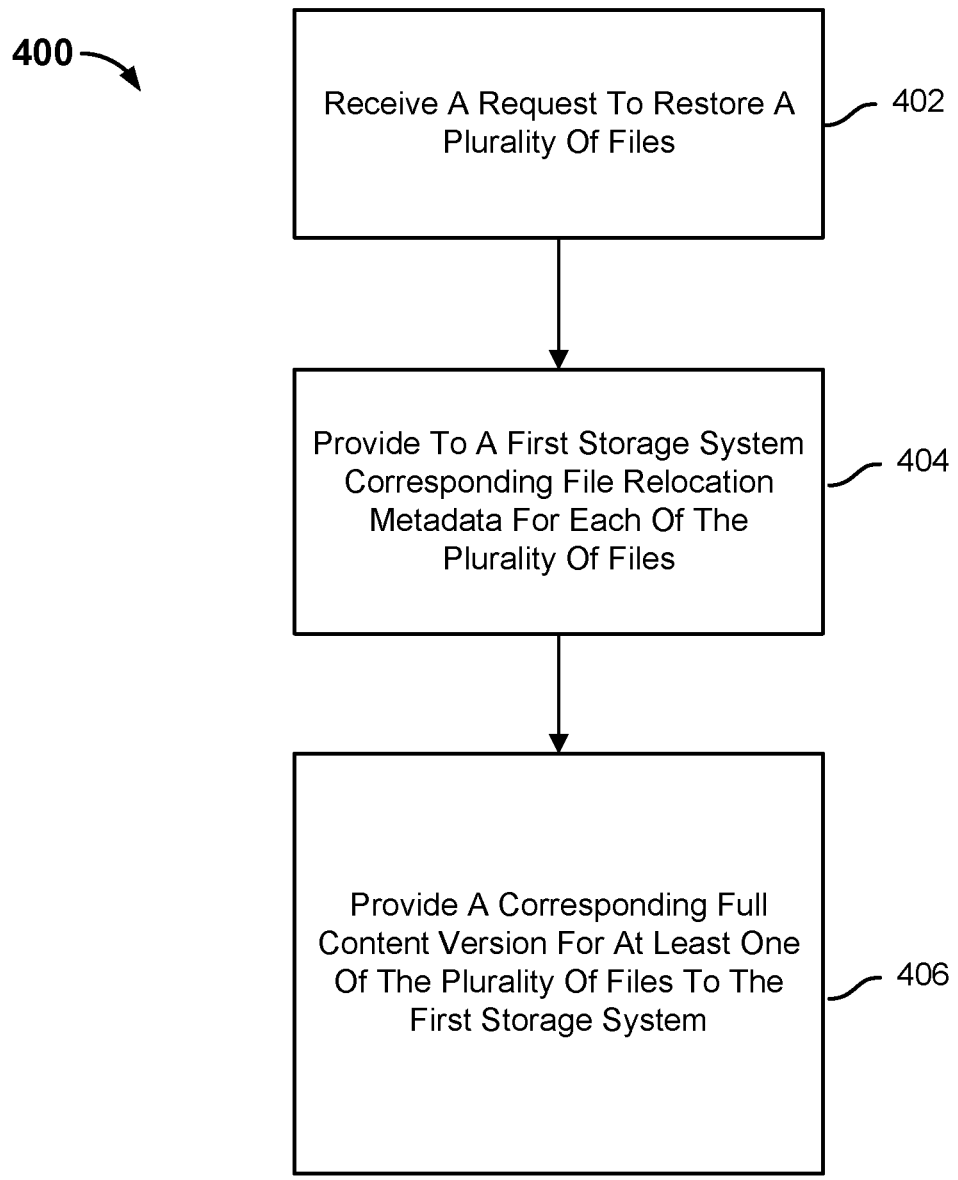
FIG. 4 is a flow chart illustrating a process for restoring a plurality of files in accordance with some embodiments.

FIG. 4 is a flow chart illustrating a process for restoring a plurality of files in accordance with some embodiments. In the example shown, process 400 may be implemented by a secondary storage system, such as secondary storage system 122.

At 402, a request to restore a plurality of files is received. The request may be to restore a plurality of files to a first storage system from a backup stored at a second storage system. A backup snapshot of the first storage system may be performed and backs up the plurality of files to a second storage system. Each backup snapshot has a corresponding tree data structure. The corresponding tree data structure may be comprised of a file system metadata snapshot tree and one or more file metadata structures. In some embodiments, the first storage system corresponds to the primary storage system. In other embodiments, the first storage system corresponds to a different storage system.

At 404, corresponding file relocation metadata for each of the plurality of files is provided. The corresponding file relocation metadata for each of the plurality of files enables accessibility of contents of the plurality of files at the first storage system without storing entire contents of the plurality of files at the first storage system. The file relocation metadata corresponding to a file may include information which can be used to locate the file, such as an absolute path name for the file, a location of the file, etc.

In some embodiments, in response to receiving the corresponding file relocation metadata for each of the plurality of files, the first storage system generates and stores a corresponding file relocation object for each of the plurality of files. The corresponding file relocation objects for each of the plurality of files expose accessibility of the plurality of files at the first storage system without storing entire contents of the plurality of files at the first storage system.

In some embodiments, the first storage system includes a filter driver and in response to receiving the corresponding file relocation metadata for a plurality of files, the filter driver of the first storage system maintains the corresponding file relocation metadata for each of the plurality of files.

To provide corresponding file relocation metadata for each of the plurality of files to be restored, the second storage system may initially clone a file system metadata snapshot tree corresponding to the backup that includes the plurality of files and use the cloned file system metadata snapshot tree corresponding to the backup to identify a plurality of files that were stored on the first storage system at the particular moment in time when the backup was performed. In some embodiments, the second storage system uses the file system metadata snapshot tree corresponding to the backup that includes the plurality of files to identify a plurality of files that were stored on the first storage system at the particular moment in time when the backup was performed. The second storage system may determine the corresponding file relocation metadata for the plurality of identified files based on the file system metadata snapshot tree corresponding to the backup that includes the plurality of files or the cloned file system metadata snapshot tree corresponding to the backup that includes the plurality of files.

At 406, a corresponding full content version for at least one of the plurality of files that is to be utilized by the first storage system is provided to enable direct access at the first storage system to the contents of the file instead of utilizing the corresponding file relocation metadata to access the contents of the file. Corresponding full content versions may be provided for some or all of the plurality of files.

In some embodiments, one or more file relocation objects corresponding to one or more files of the plurality of files are replaced with corresponding full content versions of the one or more files of the plurality of files while a subset of the file relocation objects is accessible at the first system. In some embodiments, a filter driver of a first storage system no longer maintains file relocation metadata corresponding to one or more files of the plurality of files when corresponding full content versions of the one or more files of the plurality of files are stored on the first storage system.

In some embodiments, all of the plurality of files associated with the backup are restored to the first storage system. The second storage system may use the source metadata and/or inferred metadata associated with the plurality of files to determine an order in which the plurality of files are to be restored to the primary storage system. A tiering policy may indicate that a first file with a more recent modification timestamp is to be restored before a second file with a later modification timestamp. A tiering policy may indicate that a third file that is accessed more frequently than a fourth file is to be restored before the fourth file.

In some embodiments, some of the plurality of files associated with the backup are restored to the first storage system. The second storage system may tier files stored on the first storage system using a hierarchical storage tier management plan that is based on one or more tiering policies. A tiering policy may be applied to the metadata associated with the file to determine whether to restore the file from the second storage system to the first storage system to the different storage tier.

For example, a tiering policy may indicate that files that have been created, accessed, or modified (e.g., data associated with a file or metadata associated with the file) within a particular time period are to be restored to the first storage system. A file system metadata snapshot tree is configured to store the metadata associated with a file (source and/or inferred). The second storage system may traverse the file system metadata snapshot trees associated with the particular time period to identify the one or more files that have been created, accessed, or modified within the particular time period.

In another example, a tiering policy may indicate that files that have been accessed or modified more than a threshold number of times within a particular time period are to be restored to the first storage system. The second storage system may traverse the file system metadata snapshot trees associated with the particular time period to determine an estimated number of times a file has been accessed or modified within the particular time period. For each file, the second storage system may compare the estimated number of times the file has been accessed or modified within the particular time period to the threshold number to identify one or more files that were accessed or modified more than the threshold number of times within the particular time period.

After the one or more files are identified, the second storage system may restore the one or more identified files by sending to the first storage system the data associated with the one or more identified files. In some embodiments, in response to receiving data associated with a file, the first storage system stores the data associated with the file, replaces the file relocation object corresponding to the file with the file, and deletes the file relocation object corresponding to the file. In some embodiments, in response to receiving data associated with the file, the first storage system stores the data associated with the file and the filter driver no longer maintains the file relocation metadata corresponding to the restored file. The second storage system may use the source metadata and/or inferred metadata associated with the identified plurality of files to determine an order in which the one or more identified files are to be restored to the first storage system.

Figure 5:
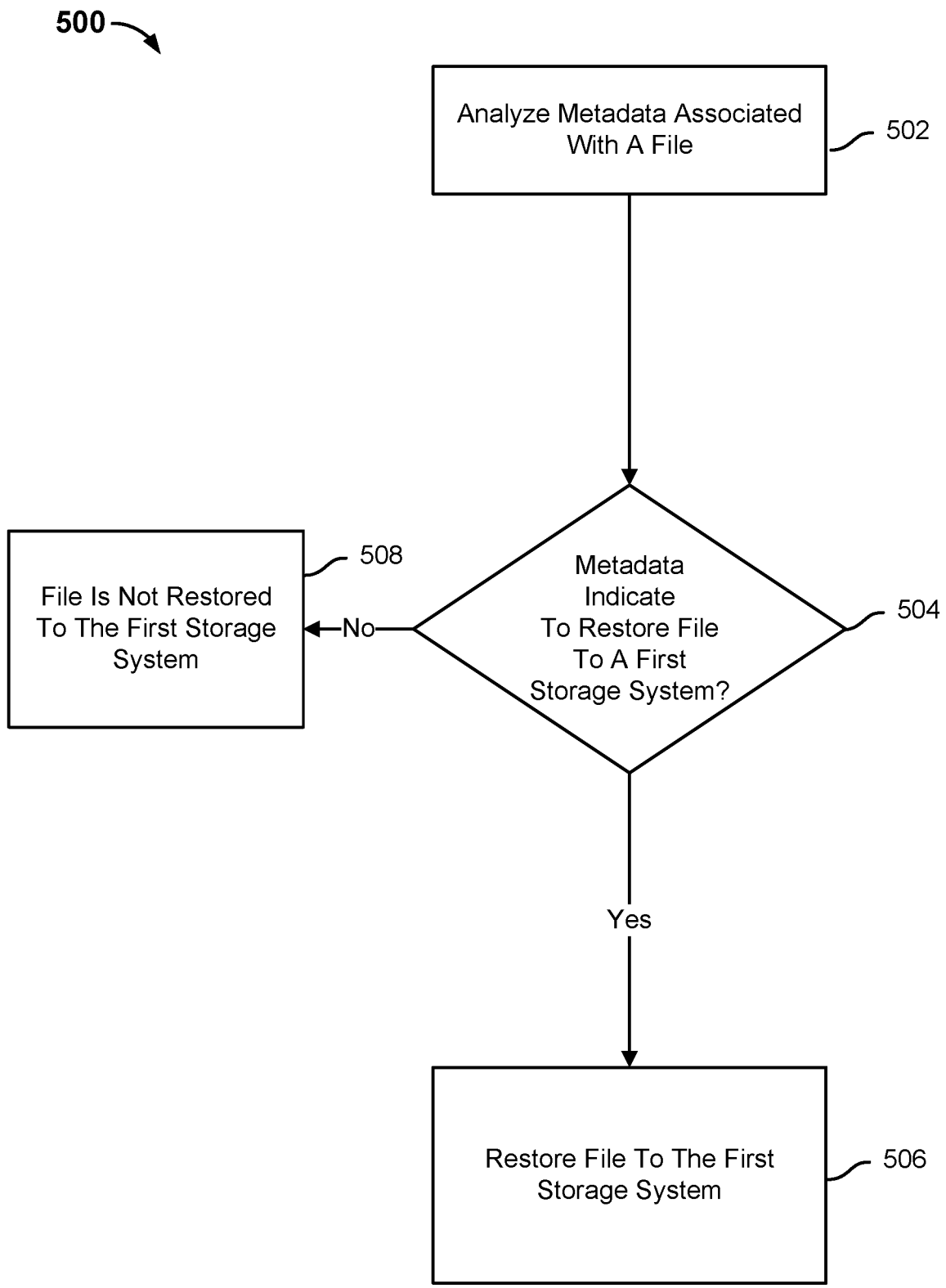
FIG. 5 is a flow chart illustrating a process for restoring a plurality of files in accordance with some embodiments.

FIG. 5 is a flow chart illustrating a process for restoring a plurality of files in accordance with some embodiments. In the example shown, process 500 may be implemented at a storage system, such as secondary storage system 122. In some embodiments, process 500 is implemented to perform some or all of step 406 of process 400.

At 502, metadata associated with a file is analyzed. The metadata associated with the file may include source metadata associated with the file and/or inferred metadata associated with the file.

Source metadata may include access control information and historical information. Access control information may include the owner of the file, the creator of the file, the last modifier of the file, users or groups allowed read, write, modify access to the file, and more. Historical information may include a creation time, a last edited time, a last read time, a last access time, etc.

The source metadata associated with the file provides the secondary storage system with point-in-time metadata information. The source metadata associated with the file may have changed a plurality of times in between backup snapshots, but the source metadata associated with the file included in a backup snapshot represents a state of the source metadata associated with the file at the time the backup snapshot is performed.

The inferred metadata associated with a file also provides the secondary storage system with point-in-time metadata information. Inferred metadata associated with a file may be based on the source metadata associated with a file that is received in one or more backup snapshots, data associated with the file that is received in one or more backup snapshots, and/or metadata determined based on backup snapshot information (e.g., a timestamp associated with a backup snapshot).

The second storage system may use the metadata associated with the file to determine whether the file was created, accessed, or modified (e.g., data associated with the file or metadata associated with the file) within a particular time period. The second storage system may also use the metadata associated with the file to determine whether the file was accessed or modified more than a threshold amount of times within a particular time period.

At 504, it is determined whether the metadata associated with the file indicates to restore the file to a first storage system. In some embodiments, it is determined whether the file has been created, accessed, or modified within a particular time period. In some embodiments, it is determined whether the file has been accessed or modified more than a threshold amount of times within a particular time period.

In the event it is determined that the metadata associated with the file indicates to restore the file to a first storage system, process 500 proceeds to 506. In the event it is determined that the metadata associated with the file does not indicate to restore the file to a first storage system, process 500 proceeds to 508.

At 506, the file is restored to the first storage system. At 508, the file is not restored to the first storage system. Accordingly, a file relocation object or file relocation metadata corresponding to the file may be maintained on the first storage system.

Figure 6:
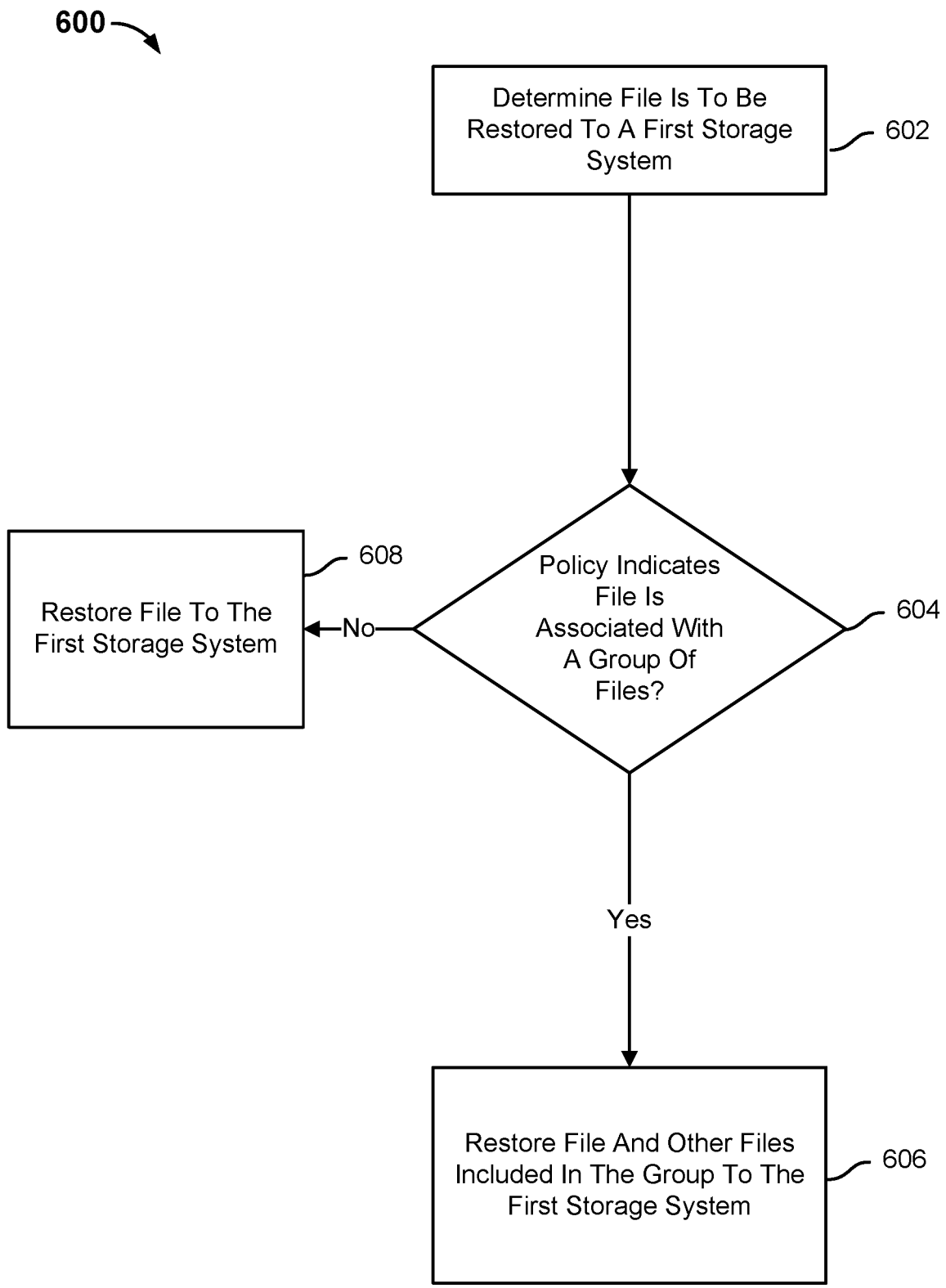
FIG. 6 is a flow chart illustrating a process for restoring a file in accordance with some embodiments.

FIG. 6 is a flow chart illustrating a process for restoring a file in accordance with some embodiments. In the example shown, process 600 may be implemented at a storage system, such as secondary storage system 122. In some embodiments, process 600 is implemented to perform some or all of step 406 of process 400. In some embodiments, process 600 is implemented to perform some or all of step 506 of process 500.

At 602, it is determined that a file is to be restored to a first storage system. In some embodiments, it is determined or estimated that the file has been created, accessed or modified (e.g., data associated with the file or metadata associated with the file) within a particular time period. In some embodiments, it is determined or estimated that the file has been accessed or modified, or edited more than a threshold amount of times within a particular time period.

At 604, it is determined whether a policy associated with the first storage system indicates the file is associated with a group of files. A policy associated with the first storage system may indicate that a group of files is to be stored on the same storage tier. For example, a first file may be stored in a directory with one or more other files. A storage system may determine that the first file is to be restored to a first storage system. This may cause the first file and the one or more other files to be restored to the first storage system. In the event it is determined that a policy associated with the first storage system indicates the file is associated with a group of files, process 600 proceeds to 606. In the event it is determined whether a policy associated with the first storage system indicates the file is not associated with a group of files, process 600 proceeds to 608.

At 606, the file and other files included in the group are restored to the first storage system. The file relocation objects corresponding to the file and the other files included in the group are replaced with the file and the other files. In some embodiments, the file relocation metadata corresponding to the file and the other files included in the group are no longer maintained by a filter driver of the first storage system.

At 608, the file is restored to the first storage system. The file relocation object of the file is replaced with the file. In some embodiments, the file relocation metadata corresponding to the file is no longer maintained by a filter driver of the first storage system.

Figure 7:
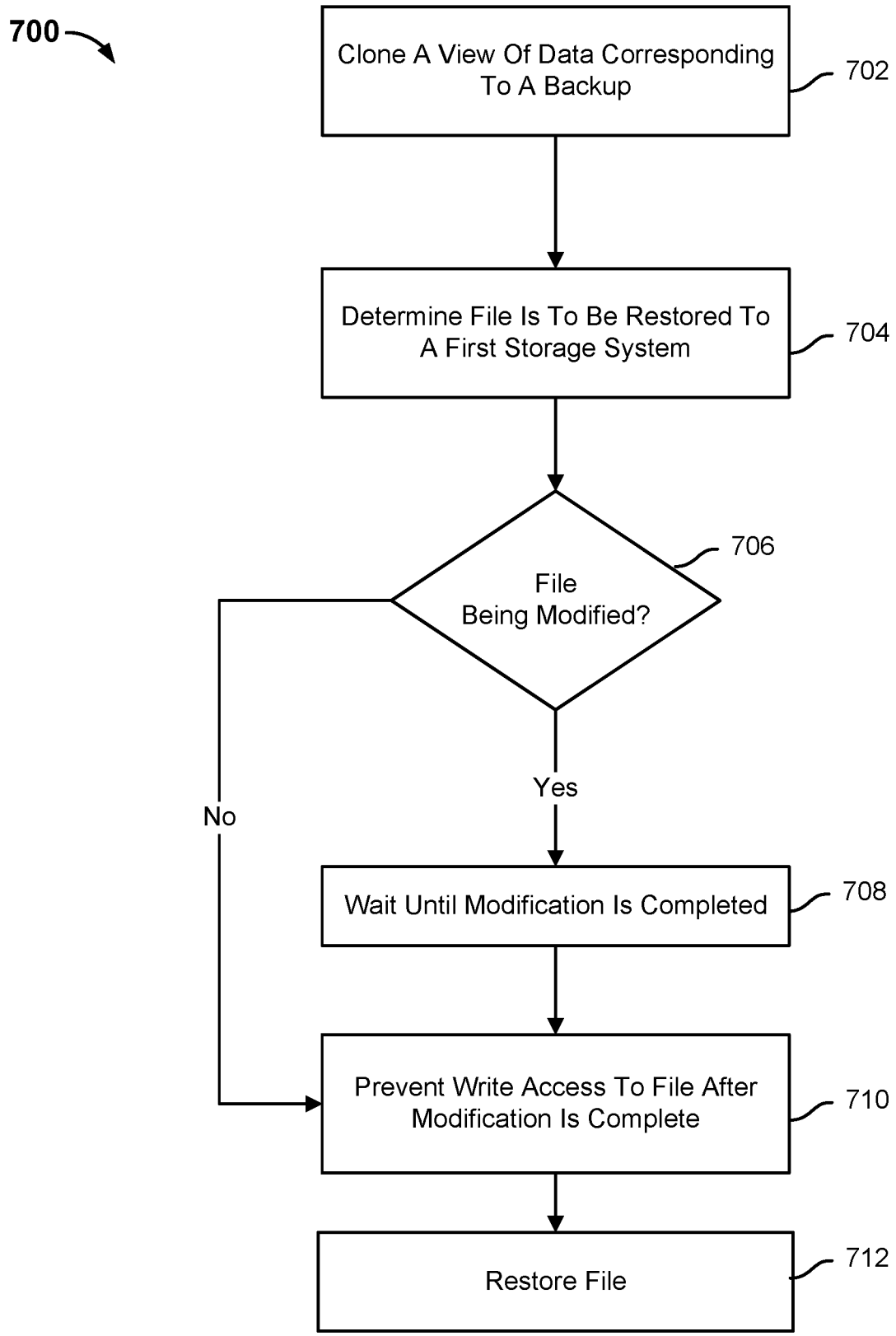
FIG. 7 is a flow chart illustrating a process for restoring a file in accordance with some embodiments.

FIG. 7 is a flow chart illustrating a process for restoring a file in accordance with some embodiments. In the example shown, process 700 may be performed by a storage system, such as secondary storage system 122. In some embodiments, process 700 is implemented to perform some of steps 404 and/or 406 of process 400.

At 702, a view of data corresponding to a backup is cloned. A backup snapshot of the first storage system's file system data may be received by a second storage system. The second storage system may store the file system data and generate a view of data corresponding to the backup snapshot. The view of data corresponding to the backup snapshot may be represented using a tree data structure. The tree data structure is comprised of a file system metadata snapshot tree and one or more file metadata structures. A root node of the file system metadata snapshot tree is cloned. The cloned file system metadata snapshot tree is a live view, which means that the cloned file system metadata snapshot tree may be modified while data associated with the cloned file system metadata snapshot tree is being restored to a first storage system.

At 704, a file is determined to be restored to a first storage system. The cloned file system metadata snapshot tree stores metadata associated with the file. The metadata associated with the file may be stored in a leaf node of the cloned file system metadata snapshot tree. The metadata may indicate that the file is to be restored to the first storage system.

At 706, it is determined whether the file is being modified. A first storage system may store a plurality of file relocation objects corresponding to the files stored on the second storage system or maintain file relocation metadata corresponding to the files stored on the second storage system. The first storage system may receive from a client device a request to modify the file. The first storage system may redirect the request to the second storage system. A write lock may be obtained to modify the file stored on the second storage system. The second storage system may determine whether there are any active write locks associated with the file. A file metadata structure corresponding to the file may be cloned and the cloned file metadata structure corresponding to the file may include the modifications to the file.

In the event the file is being modified, that is, the file is associated with an active write lock, process 700 proceeds to 708. In the event the file is not being modified, that is, the file is not associated with an active write lock, process 700 proceeds to 710.

At 708, the system waits until the modification is completed. The system waits until the active write lock associated with the file is released.

At 710, write access to the file is prevented. If the file was being modified (step 706), then additional modifications to the file will be prevented after the step 706 modification is completed. The second storage system may prevent a requesting entity, such as a client device, from obtaining a write lock for the file. In some cases, read access may still be permitted.

At 712, the file is restored. The second storage system may traverse a file system metadata snapshot tree to the cloned file metadata structure corresponding to the file. The cloned file metadata structure corresponding to the file stores metadata associated with the file. The data associated with the file (modifications included) may be located using the file metadata structure corresponding to the file. The located data is provided to the first storage system and the file is restored.

Figure 8:
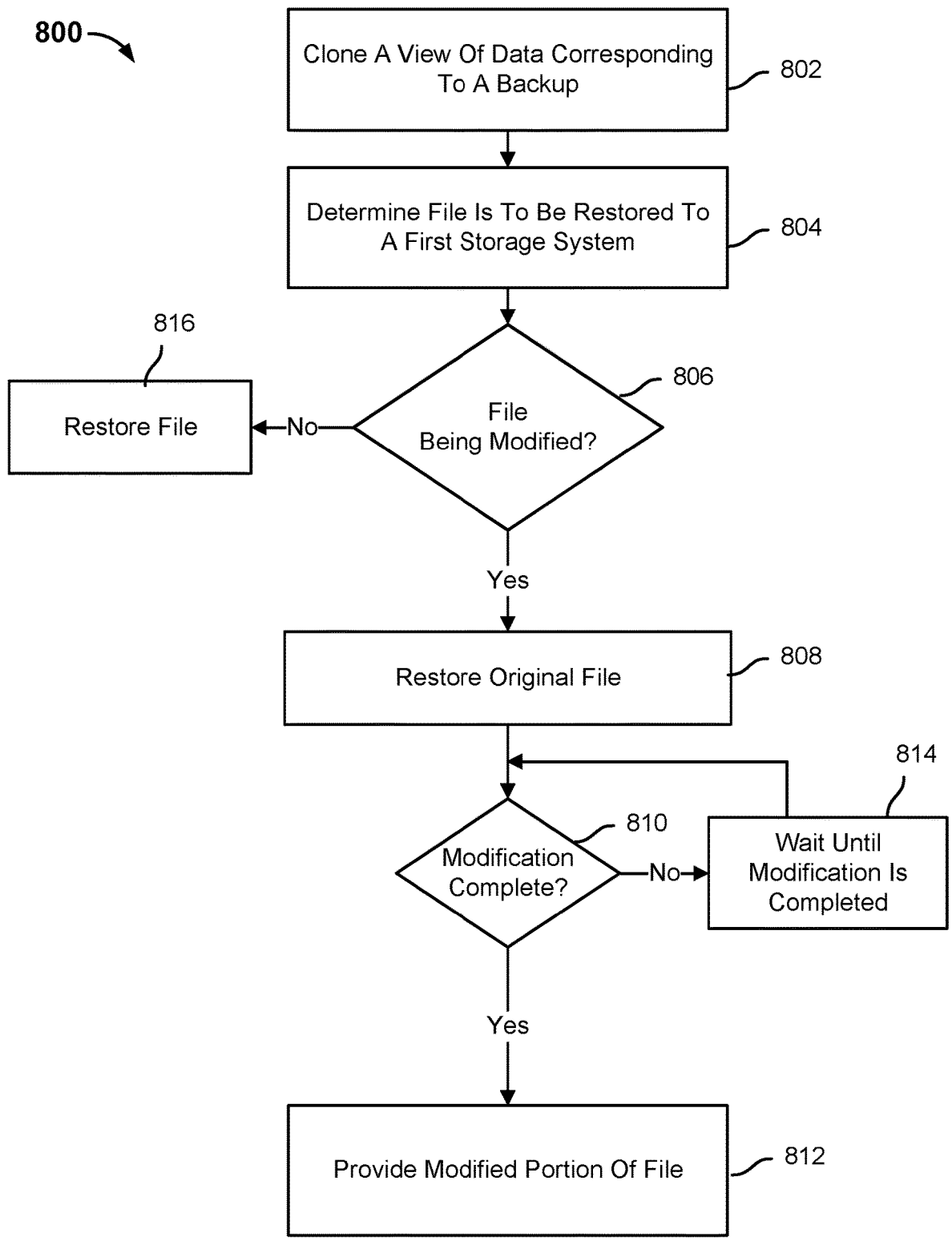
FIG. 8 is a flow chart illustrating a process for restoring a file in accordance with some embodiments.

FIG. 8 is a flow chart illustrating a process for restoring a file in accordance with some embodiments. In the example shown, process 800 may be performed by a storage system, such as secondary storage system 122. In some embodiments, process 800 is implemented to perform some of steps 404 and/or 406 of process 400.

At 802, a view of data corresponding to a backup is cloned. A backup snapshot of a first storage system's file system data may be received by a second storage system. The second storage system may store the file system data and generate a view of data corresponding to the backup snapshot. The view of data corresponding to the backup snapshot may be represented using a tree data structure. The tree data structure is comprised of a file system metadata snapshot tree and one or more file metadata structures. A root node of the file system metadata snapshot tree is cloned. The cloned file system metadata snapshot tree is a live view, which means that the cloned file system metadata snapshot tree may be modified while data associated with the cloned file system metadata snapshot tree is being restored to a first storage system.

At 804, a file is determined to be restored to a first storage system. The cloned file system metadata snapshot tree stores metadata associated with the file. The metadata associated with the file may be stored in a leaf node of the cloned file system metadata snapshot tree. The metadata may indicate that the file is to be restored to the first storage system.

At 806, it is determined whether the file is being modified. A first storage system may store a plurality of file relocation objects corresponding to the files stored on the second storage system or maintain file relocation metadata corresponding to the files stored on the second storage system. The first storage system may receive from a client device a request to modify the file. The first storage system may redirect the request to the second storage system. A write lock may be obtained to modify the file stored on the second storage system. The second storage system may determine whether there are any active write locks associated with the file. A file metadata structure corresponding to the file may be cloned and the cloned file metadata structure corresponding to the file may include the modifications to the file.

In the event the file is being modified, that is, the file is associated with an active write lock, process 800 proceeds to 808. In the event the file is not being modified, that is, the file is not associated with an active write lock, process 800 proceeds to 816 where the file is restored to the first storage system.

At 808, the original file is restored to the first storage system. The second storage system may traverse a file system metadata snapshot tree to a file metadata structure corresponding to the file. The file metadata structure corresponding to the file stores metadata associated with the file. The data associated with the file may be located using the file metadata structure corresponding to the file. The located data is provided to the first storage system and the file is restored.

At 810, it is determined whether the modification is complete. In the event it is determined that the modification is complete, process 800 proceeds to 812 and the modified portion of the file is provided to the first storage system. The modified portion of the file may be found by traversing the cloned file metadata structure corresponding to the modified file. In response to receiving the modifications, the first storage system may merge the modifications with the file that was restored at 808. In the event it is determined that the modifications are not complete, process 800 proceeds to 814. At 814, the system waits until the modification is completed. The system waits until the active write lock associated with the file is released.

Figure 9:
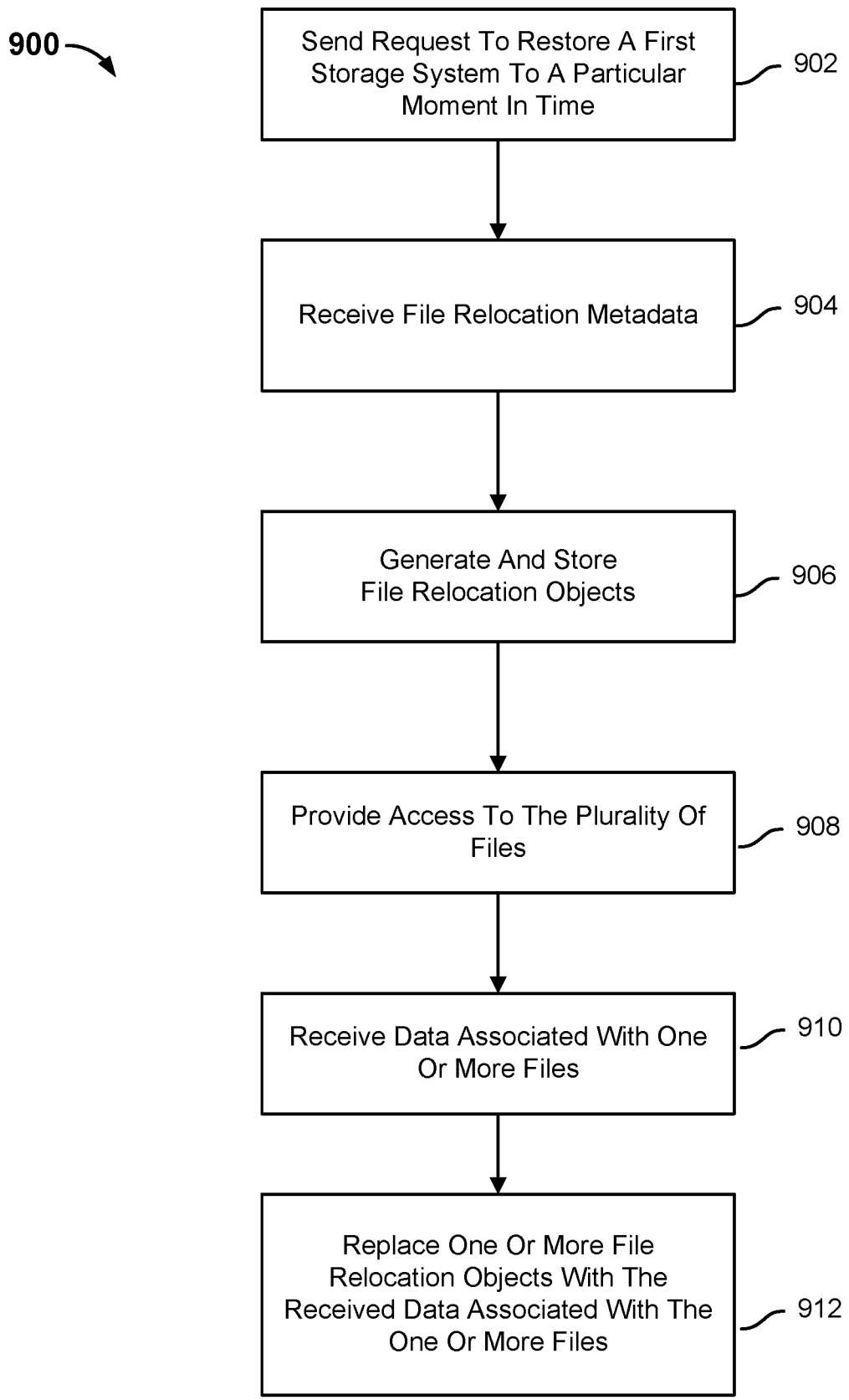
FIG. 9 is a flow chart illustrating a process for restoring a file in accordance with some embodiments.

FIG. 9 is a flow chart illustrating a process for restoring a file in accordance with some embodiments. In the example shown, process 900 may be performed by a first storage system, such as primary storage system 112.

At 902, a request to restore a first storage system to a particular moment in time is sent. The first storage system may be configured to perform a plurality of backup snapshots of its file system data and send the file system data to a second storage system. A backup snapshot may be a full backup snapshot or an incremental backup snapshot. The second storage system may receive a plurality of backup snapshots of the first storage system's file system data. The second storage system may store the file system data associated with a backup snapshot and generate a tree data structure corresponding to the backup snapshot.

The tree data structure corresponding to a backup snapshot may be comprised of a file system metadata snapshot tree and one or more file metadata structures. As discussed above, each tree data structure corresponding to a backup snapshot is a fully hydrated backup. Regardless of whether a backup snapshot is a full backup snapshot or an incremental backup snapshot, the tree data structure corresponding to the backup snapshot represents a state of the first storage system when the backup snapshot is performed.

The request to restore the first storage system to a particular moment in time may be used to restore the first storage system to a state that corresponds to any of the backup snapshots that were performed.

In some embodiments, the first storage system (e.g.,. the system from which the backup snapshot was received) sends the request. In other embodiments, a different storage system sends the request. For example, a replacement system for the system that was backed up sends the request.

At 904, corresponding file relocation metadata for each file stored on the first storage system at the particular moment in time is received. The file relocation metadata corresponding to a file may include information which can be used to locate the file, such as an absolute path name for the file, a location of the file (e.g., a location on a secondary storage system or cloud storage system(s)), etc.

The second storage system may initially clone a file system metadata snapshot tree corresponding to the backup that includes the plurality of files and use the file system metadata snapshot tree corresponding to the backup that includes the plurality of files or the cloned file system metadata snapshot tree corresponding to the backup or the file system metadata snapshot tree corresponding to the backup that includes the plurality of files to identify a plurality of files that were stored on the first storage system at the particular moment in time when the backup was performed. The second storage system may determine the file relocation metadata for the plurality of identified files based on the file system metadata snapshot tree corresponding to the backup that includes the plurality of files or the cloned file system metadata snapshot tree corresponding to the backup that includes the plurality of files.

At 906, file relocation objects are generated and stored. In some cases, the file objects are generated and/or stored in response to a request from the second storage system to generate and/or store the file objects. In some embodiments, in response to receiving the corresponding file relocation metadata for each file stored on the first storage system at the particular moment in time, the first storage system generates and stores a corresponding file relocation object (e.g., symbolic link, stub file, etc.) for each of the files stored on the first storage system at the particular moment in time.

In some embodiments, the first storage system includes a filter driver and in response to receiving the corresponding file relocation metadata for each file stored on the first storage system at the particular moment in time, the filter driver of the first storage system maintains the corresponding file relocation metadata for each file stored on the first storage system at the particular moment in time.

At 908, access to the plurality of files is provided. A request for a file may be received at the first storage system. The first storage system may enable retrieval of the file via a file relocation object or the file relocation metadata.

At 910, data associated with one or more files is received. The second storage system may restore some or all of the files associated with a state of the first storage system at the particular moment in time.

In some embodiments, all of the plurality of files associated with the backup are restored to the first storage system. In some embodiments, some of the plurality of files associated with the backup are restored to the first storage system. The order in which the plurality of files associated with the backup are restored to the first storage system may be determined based on the source metadata and/or inferred metadata associated with the plurality of files.

At 912, one or more file relocation objects are replaced with the received data associated with the one or more files. In some embodiments, one or more file relocation objects are replaced responsive to a request received from the second storage system. The first storage system may be configured to replace a file relocation object with the actual file contents. After a file relocation object is replaced with the actual file, the first storage system provides the data associated with the file in response to a request for the file instead of enabling retrieval of the data associated with the file.

In some embodiments, in response to receiving data associated with the file, the first storage system stores the data associated with the file and the filter driver no longer maintains the file relocation metadata corresponding to the restored file.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request to restore a plurality of files to a first storage system from a backup stored at a second storage system; and
   in response to the request to restore the plurality of files included in the backup:
      providing from the second storage system to the first storage system, corresponding file relocation metadata for each of the plurality of files, wherein the corresponding file relocation metadata for each of the plurality of files enables accessibility of contents of the plurality of files at the first storage system without storing entire contents of the plurality of files at the first storage system;
      analyzing metadata associated with each of the plurality of files included in the backup to determine a subset of the plurality of files included in the backup to restore to the first storage system, wherein analyzing the metadata associated with each of the plurality of files included in the backup includes:
         inferring a corresponding number of times each of the plurality of files included in the backup has been accessed or modified within a particular period of time; and
         determining to include at least two files of the plurality of files in the subset in response to inferring that the corresponding number of times the at least two files have been accessed or modified is greater than a threshold number; and based on an analysis of the metadata associated with each of the plurality of files and a policy providing from the second storage system to the first storage system the subset of the plurality of files that includes a corresponding full content version of the at least two files of the plurality of files that is to be utilized by the first storage system to enable direct access at the first storage system to contents of the at least two files of the plurality of files instead of utilizing corresponding file relocation metadata for the at least two files of the plurality of files to access the contents of the at least one of the plurality of files, wherein the policy indicates that an order in which the corresponding full content versions of the at least two files of the plurality of files are provided from the second storage system to the first storage system is based on the inferred corresponding number of times the at least two files were accessed or modified within the particular period of time.

2. The method of claim 1, wherein in response to receiving the corresponding file relocation metadata for each of the plurality of files, the first storage system generates corresponding file relocation objects for each of the files.

3. The method of claim 1, wherein in response to receiving the corresponding file relocation metadata for each of the plurality of files, a filter driver of the first storage system maintains the corresponding file relocation metadata for each of the plurality of files.

4. The method of claim 1, wherein the corresponding file relocation metadata for each of the plurality of files references a corresponding location associated with the second storage system.

5. The method of claim 1, wherein the metadata associated with a file included in the plurality of files is comprised of at least one of source metadata associated with the file or inferred metadata associated with the file.

6. The method of claim 1, wherein analyzing the metadata associated with a file included in the plurality of files comprises determining whether the metadata associated with the file indicates to restore the file to the first storage system.

7. The method of claim 6, wherein in response to determining that the metadata associated with the file does not indicate to restore the file to the first storage system, a file relocation object corresponding to the file is maintained on the first storage system.

8. The method of claim 6, wherein the corresponding full content version of the file is provided in response to determining that the metadata associated with the file indicates to restore the file to the first storage system.

9. The method of claim 6, wherein determining whether the metadata associated with the file indicates to restore the file to the first storage system comprises determining whether the policy indicates that the file is associated with a group of files.

10. The method of claim 9, wherein in response to determining that the policy indicates that the file is associated with the group of files, restoring to the first storage system the file and one or other files included in the group of files.

11. The method of claim 1, wherein the metadata associated with a file included in the plurality of files indicates the file is to be restored to the first storage system, wherein providing a corresponding full content version of the file includes determining whether the file is being modified.

12. The method of claim 11, wherein in response to determining that the file is being modified, restoring the file to the first storage system.

13. The method of claim 12, further comprising providing modifications associated with the restored file to the first storage system, wherein in response to receiving the modifications associated with the restored file, the first storage system merges the restored file with the modifications.

14. The method of claim 1, wherein a placement of a file in the order in which the corresponding full content version of the at least two files of the plurality of files is provided is based on a frequency at which the file was accessed within the particular period of time.

15. The method of claim 1, wherein a placement of a file in the order in which the corresponding full content version for the at least one of the plurality of files is provided is based on a creation time, last access time, or a last modification time associated with the file.

16. A computer program product, the computer program product being embodied in a non-transitory computer readable storage medium and comprising computer instructions for:
receiving a request to restore a plurality of files to a first storage system from a backup stored at a second storage system; and
in response to the request to restore the plurality of files included in the backup:
providing from the second storage system to the first storage system, corresponding file relocation metadata for each of the plurality of files, wherein the corresponding file relocation metadata for each of the plurality of files enables accessibility of contents of the plurality of files at the first storage system without storing entire contents of the plurality of files at the first storage system;
analyzing metadata associated with each of the plurality of files included in the backup to determine a subset of the plurality of files included in the backup to restore to the first storage system, wherein analyzing the metadata associated with each of the plurality of files included in the backup includes:
inferring a corresponding number of times each of the plurality of files included in the backup has been accessed or modified within a particular period of time; and
determining to include at least two files of the plurality of files in the subset in response to inferring that the corresponding number of times the at least two files have been accessed or modified is greater than a threshold number; and
based on an analysis of the metadata associated with each of the plurality of files and a policy providing from the second storage system to the first storage system the subset of the plurality of files that includes a corresponding full content version of the at least two files of the plurality of files that is to be utilized by the first storage system to enable direct access at the first storage system to contents of the at least two files of the plurality of files instead of utilizing corresponding file relocation metadata for the at least two files of the plurality of files to access the contents of the at least one of the plurality of files, wherein the policy indicates that an order in which the corresponding full content versions of the at least two files of the plurality of files are provided from the second storage system to the first storage system is based on the inferred corresponding number of times the at least two files were accessed or modified within the particular period of time.

17. A system, comprising:

a processor; and a memory coupled with the processor, wherein the memory is configured to provide the processor with instructions which when executed cause the processor to:

receive a request to restore a plurality of files to a first storage system from a backup stored at a second storage system; and in response to the request to restore the plurality of files included in the backup, the processor is configured to:

provide from the second storage system to the first storage system, corresponding file relocation metadata for each of the plurality of files, wherein the corresponding file relocation metadata for each of the plurality of files enables accessibility of contents of the plurality of files at the first storage system without storing entire contents of the plurality of files at the first storage system;

analyze metadata associated with each of the plurality of files included in the backup to determine a subset of the plurality of files included in the backup to restore to the first storage system, wherein to analyze the metadata associated with each of the plurality of files included in the backup, the processor is configured to:

infer a corresponding number of times each of the plurality of files included in the backup has been accessed or modified within a particular period of time; and determine to include at least two files of the plurality of files in the subset in response to inferring that the corresponding number of times the at least two files have been accessed or modified is greater than a threshold number; and based on an analysis of the metadata associated with each of the plurality of files and a policy, provide from the second storage system to the first storage system the subset of the plurality of files that includes a corresponding full content version of the at least two files of the plurality of files that is to be utilized by the first storage system to enable direct access at the first storage system to contents of the at least two files of the plurality of files instead of utilizing corresponding file relocation metadata for the at least two files of the plurality of files to access the contents of the at least one of the plurality of files, wherein the policy indicates that an order in which the corresponding full content versions of the at least two files of the plurality of files are provided from the second storage system to the first storage system is based on the inferred corresponding number of times the at least two files were accessed or modified within the particular period of time.

* * * * *